United States Patent
Nishimura et al.

(10) Patent No.: US 7,599,533 B2
(45) Date of Patent: Oct. 6, 2009

(54) IMAGE PROCESSING SYSTEM AND IMAGE PROCESSING METHOD

(75) Inventors: Hirokazu Nishimura, Hachioji (JP); Hideki Tanaka, Tama (JP); Kenji Yamazaki, Hino (JP)

(73) Assignee: Olympus Corporation, Tokyo (JP)

( * ) Notice: Subject to any disclaimer, the term of this patent is extended or adjusted under 35 U.S.C. 154(b) by 654 days.

(21) Appl. No.: 10/537,755

(22) PCT Filed: Dec. 5, 2003

(86) PCT No.: PCT/JP03/15582

§ 371 (c)(1),
(2), (4) Date: Jun. 6, 2005

(87) PCT Pub. No.: WO2004/049923

PCT Pub. Date: Jun. 17, 2004

(65) Prior Publication Data

US 2006/0050966 A1    Mar. 9, 2006

(30) Foreign Application Priority Data

Dec. 5, 2002   (JP)   .............................. 2002-354290

(51) Int. Cl.
G06K 9/00 (2006.01)
H05G 1/64 (2006.01)
(52) U.S. Cl. .................... 382/128; 382/209; 378/98
(58) Field of Classification Search ............... 382/100, 382/103, 106, 154, 128–133, 168, 181, 190–194, 382/203, 209, 224, 232, 251, 260, 274, 275, 382/276, 288, 291, 305, 312, 318, 134; 606/1; 378/98; 348/65
See application file for complete search history.

(56) References Cited

U.S. PATENT DOCUMENTS

| | | | | |
|---|---|---|---|---|
| 5,835,561 | A * | 11/1998 | Moorman et al. | 378/98 |
| 6,665,446 | B1 * | 12/2003 | Kato | 382/251 |
| 7,194,117 | B2 * | 3/2007 | Kaufman et al. | 382/128 |
| 2002/0090126 | A1 * | 7/2002 | Oosawa | 382/132 |
| 2002/0118278 | A1 * | 8/2002 | Kobayashi et al. | 348/65 |
| 2003/0055410 | A1 * | 3/2003 | Evans et al. | 606/1 |

FOREIGN PATENT DOCUMENTS

| | | |
|---|---|---|
| JP | 03-032635 | 2/1991 |
| JP | 8-145628 | 6/1996 |
| JP | 10-14864 | 1/1998 |

(Continued)

OTHER PUBLICATIONS

Haruhiro, "Magnification Endoscopy in the Esophagus and Stomach", Digestive Endoscopy (2001) 13 (Suppl.).*

(Continued)

*Primary Examiner*—Seyed Azarian
(74) *Attorney, Agent, or Firm*—Scully, Scott, Murphy & Presser, P.C.

(57) ABSTRACT

According to the present invention, an image processing method includes: an input step of inputting an image; and an extraction step of performing matching between a template, obtained by modeling a predetermined structural component in the image, and the image input in the input step to extract a structural component serving as an extraction target in the image.

24 Claims, 15 Drawing Sheets

FOREIGN PATENT DOCUMENTS

| | | |
|---|---|---|
| JP | 2918162 | 4/1999 |
| JP | 11-271232 | 10/1999 |
| JP | 2002-165757 | 6/2002 |
| JP | 2002-336193 | 11/2002 |
| JP | 2003-265463 | 9/2003 |

OTHER PUBLICATIONS

Inoue, Haruhiro, "Magnification Endoscopy in the Esophagus and Stomach", Digestive Endoscopy (2001) 13 (Suppl.), S40-S41.

Yagi, Kazuyoshi, "Endoscopic Features and magnified Views of the Corpus in the Helicobacter Pylori-Negative Stomach", Digestive Endoscopy (2001) 13 (Suppl.), S34-S35.

Yao, Kenshi, et al., "Microgastroscopic Findings of Mucosal Microvascular Architecture as Visualized by Magnifying Endoscopy", Digestive Endoscopy (2001) 13 (Suppl.), S27-S33.

Shigemoto, Kanae, "3-jigen Buttal Model o Mochiita Kyobu x-sen CT Kara no Kessetsu In'el Ninshiki no Kosokuku", The Institute and Communication Engineers Gijutsu Kenkyu Hokoku, Jan. 24, 2002, vol. 101, No. 581, pp. 1-6.

* cited by examiner

BLOOD VESSEL IMAGE

CUT-OUT IN ONE-DIMENSIONAL DIRECTION

FIG.19
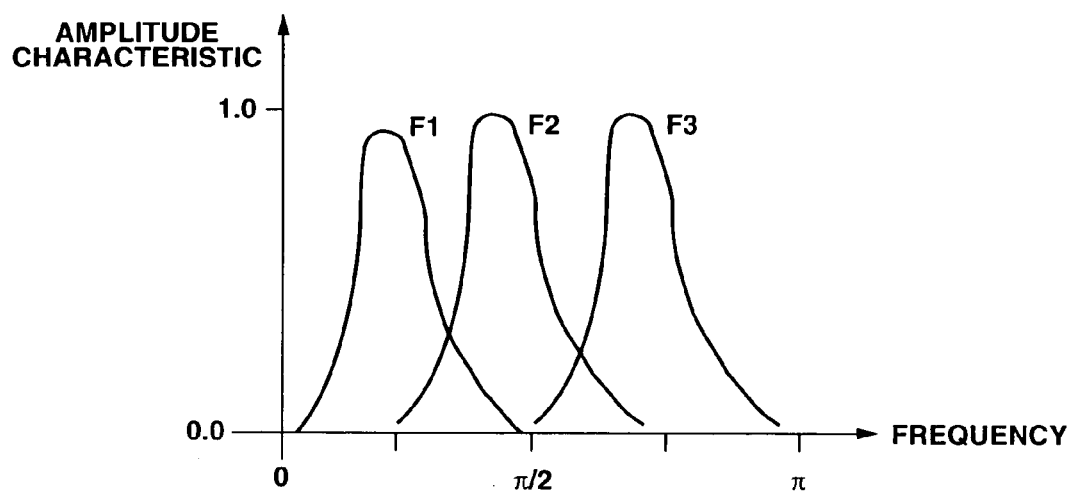
FIG.20
(A)
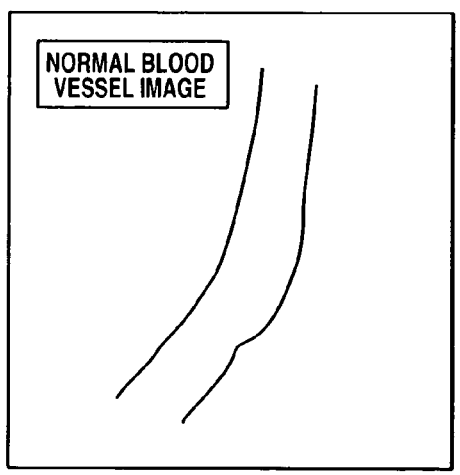
(B)
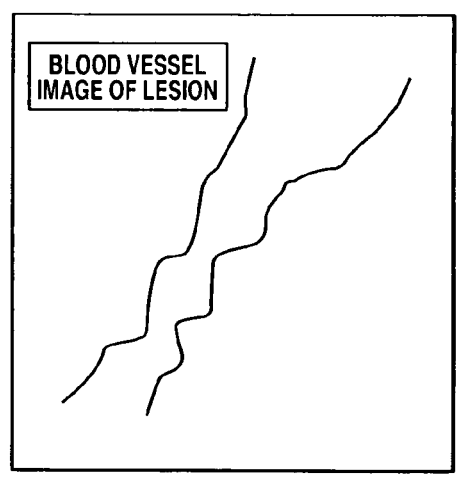

IMAGE PROCESSING SYSTEM AND IMAGE PROCESSING METHOD

TECHNICAL FIELD

The present invention relates to an image processing method for performing image processing to an endoscopic image in order to easily evaluate the amount of feature.

BACKGROUND ART

Endoscope systems are widely diffused. According to the endoscope system, a long insertion portion is inserted into a body cavity, an organ in the body cavity is observed on a monitor screen using a solid-state image pick-up device as image pick-up means, and the organ can be examined or diagnosed. Further, ultrasonic endoscope systems are also widespread. According to the ultrasonic endoscope system, an organ in the body cavity is irradiated with ultrasonic waves, and the situation of the organ is observed on a monitor screen using the reflectance or transmittance of the organ with the ultrasonic waves. Thus, the organ can be examined or diagnosed.

The final diagnoses using the above-mentioned endoscope systems mostly depend on the subjectivities of doctors. It is desired that an endoscopic diagnosis support system directly leading to an objective diagnosis using numeric data be realized.

The endoscopic diagnosis support system supports an objective diagnosis with numeric data as follows. Various amounts of feature are calculated from regions of interest (ROI) of an image of a diagnosis target. The image is categorized by threshold processing the amounts of feature or processing the amounts of feature using a statistical or non-statistical discrimination circuit, thus determining a finding or a lesion. The finding or lesion based on the image is provided to a doctor.

The amounts of feature indicate numeric values reflecting various findings of an endoscopic image and are obtained by an image processing method. When a finding related to a color tone, for example, a case where the surface of mucous membrane is red by rubefaction is converted into the amount of feature, R, G, B data constituting an endoscopic image are used, $R/(R+G+B)$ is obtained every pixel, and the average can be used as the amount of feature (the amount of feature is generally called chromaticity). In the recent endoscopic field, as the amount of feature of a color tone reflecting the bloodstream through a gastric mucosa, hemoglobin index obtained by $32 \log_2(R/G)$ is generally used.

In addition, findings related to the surface structure of a mucosa in an endoscopic image, for example, the deflation or meandering of a blood vessel observed in a visible blood vessel image, a variation in size of gastric areas, irregularity of gastric area, and the width of a groove between gastric areas are important elements for diagnoses of various diseases. These elements are processed by an image processing method, thus obtaining numeric values as the amounts of feature. Japanese Patent No. 2918162 discloses a method for calculating the above-mentioned amount of feature.

According to a recent endoscopic image processing method, Gabor features calculated using a well-known Gabor filter are processed by a spatial frequency analysis technique, that is improved for the application to endoscopic images, so that the fineness of the surface structure of a mucosa or the orientation of a pattern on the surface structure thereof is digitalized as the amount of feature.

Various amounts of feature obtained from different findings are combined into a feature vector. More complex and correct diagnosis can be supported using the feature vectors. To increase the precision of the endoscopic diagnosis support system, a method for calculating the amount of feature with high precision to digitize a significant finding based on an endoscopic image is very important.

Japanese Unexamined Patent Application Publication No. 10-14864 discloses an example of the above-mentioned endoscopic diagnosis support system and a method for calculating the amount of feature.

Significant findings for diagnoses using endoscopic observations include the shape and size of a lesion, the color tone of a mucosa, a visible blood vessel image, and the surface structure (pattern image including pits) of a mucosa. The present invention relates to an image processing method for a visible blood vessel image and the surface structure of a mucosa among the above findings.

Diseases, diagnosed using a visible blood vessel image as an important finding, include ulcerative colitis. The visible blood vessel image is important to determine the level of inflammation or the degree of remission.

Due to the appearance of a magnifying endoscope in which high image quality is realized and high resolution of a solid-state image pick-up device (CCD, or the like) is also realized, which has the same diameter and operability as those of a normal endoscope and further has a zooming function, a very minute capillary on the surface of a mucosa and the pit pattern of a stomach or a colon can be clearly observed through a recent endoscope system with the magnifying endoscope.

Living tissue can be observed using an endoscope in a clinical examination at the same level as that of a case where a tissue specimen has conventionally been observed using a stereoscopic microscope. New diagnostics using those minute structure observation views are studied actively and are established in fields related to digestive tracts and bronchial tubes.

The following examples are given:

Diagnosis of an esophageal neoplastic lesion (adenoma, cancer) based on a pattern change in interpapillary capillary loop (IPCL) on an esophageal mucosa disclosed in Reference Document 1 (H. Inoue, MAGNIFICATION ENDOSCOPY IN THE SOPHAGUS AND STOMACH, Digestive Endoscopy, JAPAN ASTROENTEROLOGICAL ENDOSCOPY SCOCIETY, Vol. 13, Supplement, July 2001, pp. S40-S41);

Diagnosis of an infection with *Helicobacter pylori* based on observations of gastric collecting venules disclosed in Reference Document 2 (K. Yagi, ENDOSCOPIC FEATURES AND MAGNIFIED VIEWS OF THE CORPUS IN THE *HELICOBACTER PYLORI*-NEGATIVE STOMACH, Digestive Endoscopy, JAPAN GASTROENTEROLOGICAL ENDOSCOPY SOCIETY, Vol. 13, Supplement, July 2001, pp. S34-S35);

Diagnosis of a classification of mucosal atrophy and neoplastic lesion based on observations of gastric microvasculatures disclosed in Reference Document 3 (K. Yao et al., MICROGASTROSCOPIC FINDINGS OF MUCOSAL MICROVASCULAR ARCHITECTURE AS VISUALIZED BY MAGNIFYING ENDOSCOPY, Digestive Endoscopy, JAPAN GASTROENTEROLOGICAL ENDOSCOPY SOCIETY, Vol. 13, Supplement, July 2001, pp. S27-S33);

Diagnosis of a neoplastic lesion of a colon using pit pattern classification disclosed in Reference Document 4 (Shin-ei Kudo, Depression Type Early Colonic Cancer, Nihon Medical Center, 1996, pp. 33-40); and Diagnosis of a bronchial infection and cancer based on observations of a microvasculature network in bronchi disclosed in Reference Document 5 (Kiyoshi Shibuya et al., Endoscopic Observations of Bronchial Dysplasia using Magnifying Bronchial Video Scope, Vol. 22, No. 8, December 2000, pp. 613-616).

On the other hand, those diagnoses based on endoscopic findings depend on subjective determinations of doctors. Disadvantageously, a variation in experience and knowledge between doctors may result in different diagnoses. It is desired that quantitative and objective diagnosis support information be provided using image processing.

More specifically, the pattern of a blood vessel or pits is extracted from an image, the form, size, uniformity, or regularity of the pattern is digitized (called the amount of feature) by various image processing techniques, and the amount of feature is processed by a discrimination circuit such as a linear discriminant function or a neural network. Thus, objective diagnosis support can be realized.

Japanese Patent No. 2918162, to the same assignee, discloses an image processing and analysis method using a binarization process.

However, the application of the image processing method with structure extraction by binarization to an endoscopic image has the following disadvantages.

Endoscopic images are obtained with various observation distances and angles. Further, in many cases, an observation subject has a curved form. Therefore, an endoscopic image has a large variation in brightness. In observing a pit pattern of a colon, generally, dye or a coloring agent, typified by indigo carmine or crystal violet, is sprayed in order to make pits clear. The density of dye may be varied or the dye may be sprayed unevenly (dye may be remained in interstitial portions other than pits).

Threshold processing is generally executed in the binarization process. For the above reason, however, it is difficult to use a fixed threshold value. Even when a threshold value is changed every image (it is studied in the character recognition field), the extraction result is changed every local area of the image because a variation in brightness or the spray condition of dye. Disadvantageously, extraction leakage may occur.

The present invention is made in consideration of the above disadvantages. It is an object of the present invention to provide an image processing method whereby a structural component such as a blood vessel image or a pit pattern serving as an extraction target can be favorably extracted in an (endoscopic) image.

Another object of the present invention is to provide an image processing method whereby a structural component such as a blood vessel image or a pit pattern serving as an extraction target can be favorably extracted in an (endoscopic) image irrespective of image shooting conditions.

Further, still another object of the present invention is to provide an image processing method for calculating the amount of feature to realize high-precision diagnosis support information.

DISCLOSURE OF INVENTION

The present invention provides an image processing method including: an input step of inputting an image; and an extraction step of performing matching between a template, obtained by modeling a predetermined structural component in the image, and the image input in the input step to extract a structural component serving as an extraction target in the image.

BRIEF DESCRIPTION OF THE DRAWINGS

FIG. 19 is a diagram explaining an example of the characteristics of band pass filters.

FIG. 20 includes diagrams explaining findings of blood vessels to be processed by an image processing method according to a fourth embodiment of the present invention.

BEST MODE FOR CARRYING OUT THE INVENTION

Embodiments of the present invention will now be described below with reference to the drawings.

FIRST EMBODIMENT

A first embodiment of the present invention will now be described with reference to FIGS. 1 to 8.

Figure 1:
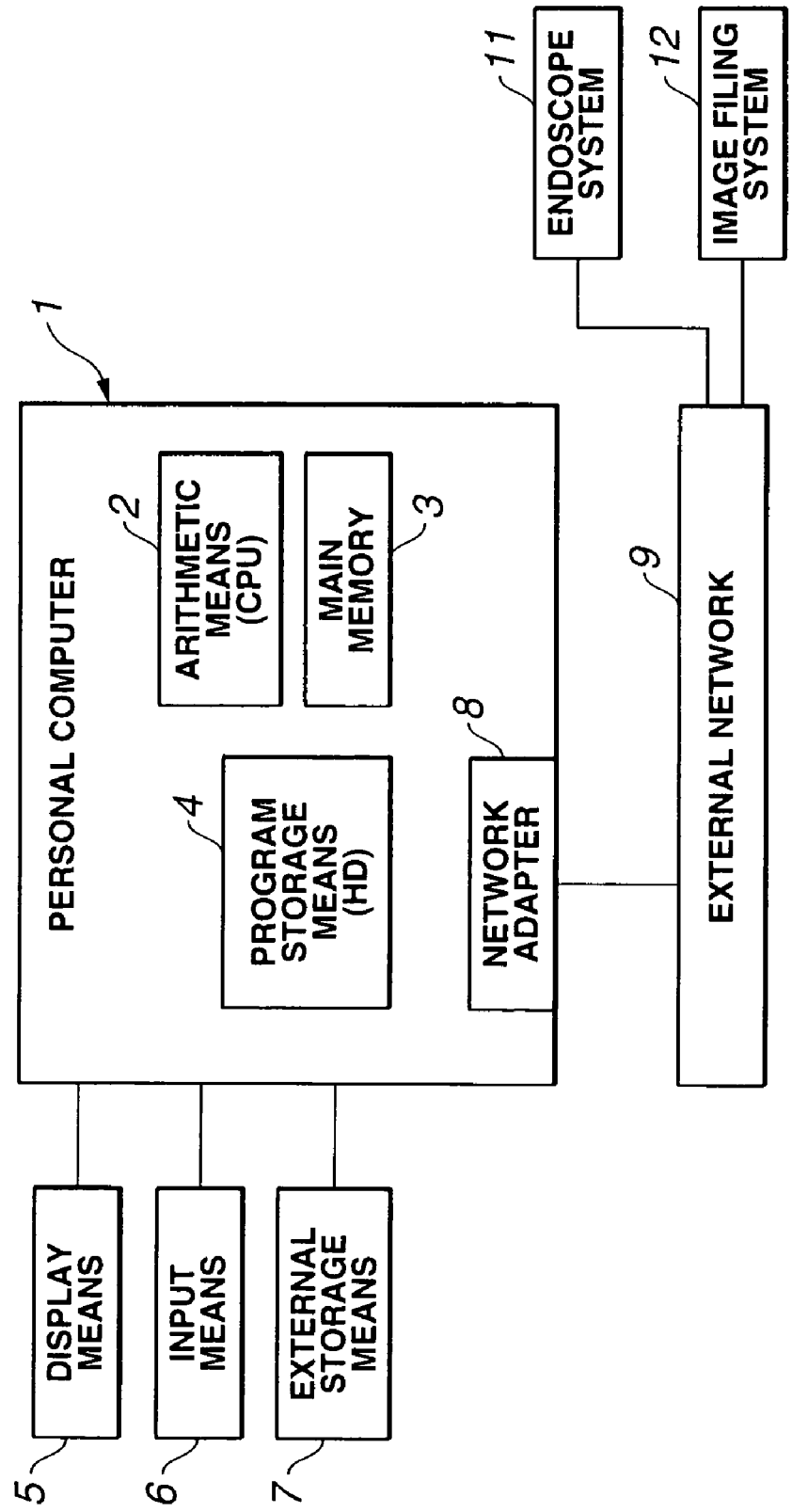
FIG. 1 is a block diagram showing the structure of a personal computer for executing an image processing method according to a first embodiment of the present invention.
Figure 2:
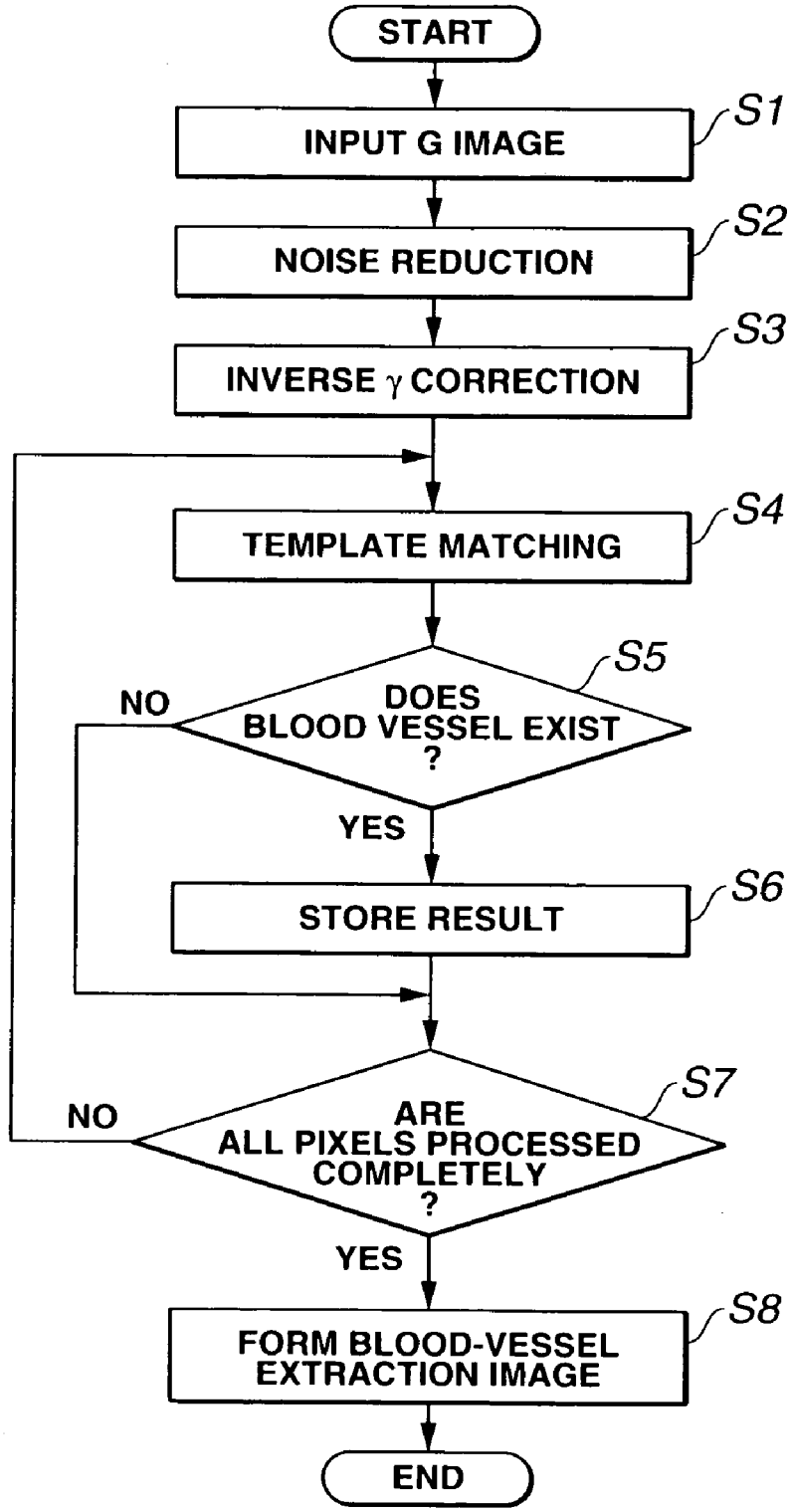
FIG. 2 is a flowchart explaining the details of a process by the image processing method according to the present embodiment.
Figure 3:
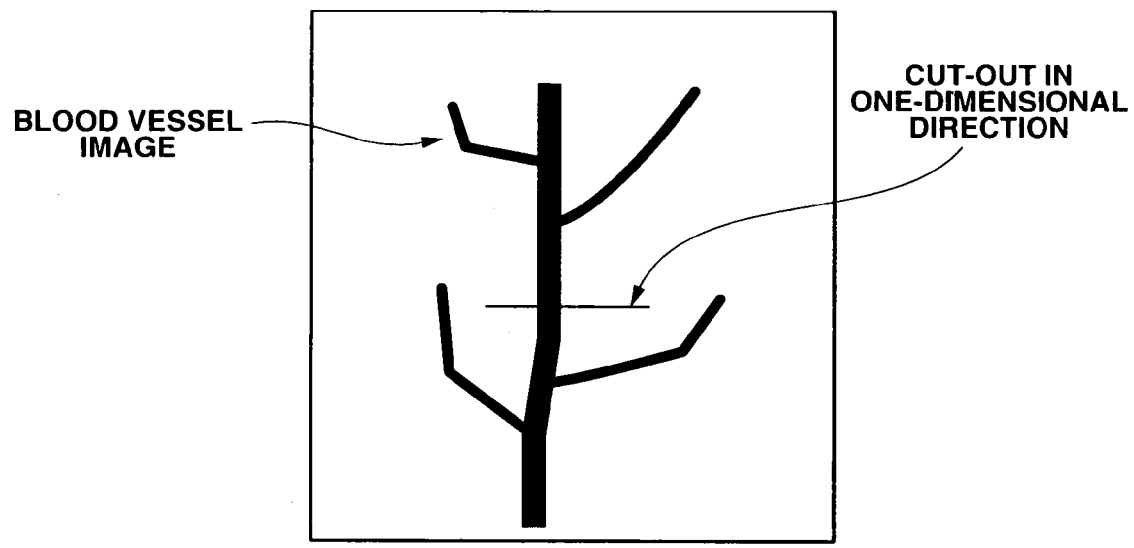
FIG. 3 is a diagram explaining a blood vessel image.
Figure 4:
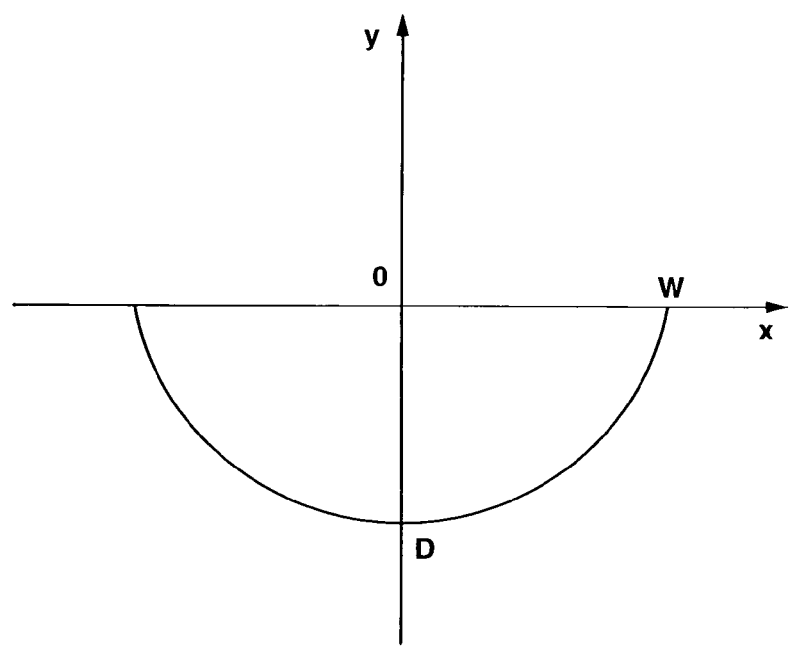
FIG. 4 is a diagram explaining a blood vessel model according to the present embodiment.
Figure 5:
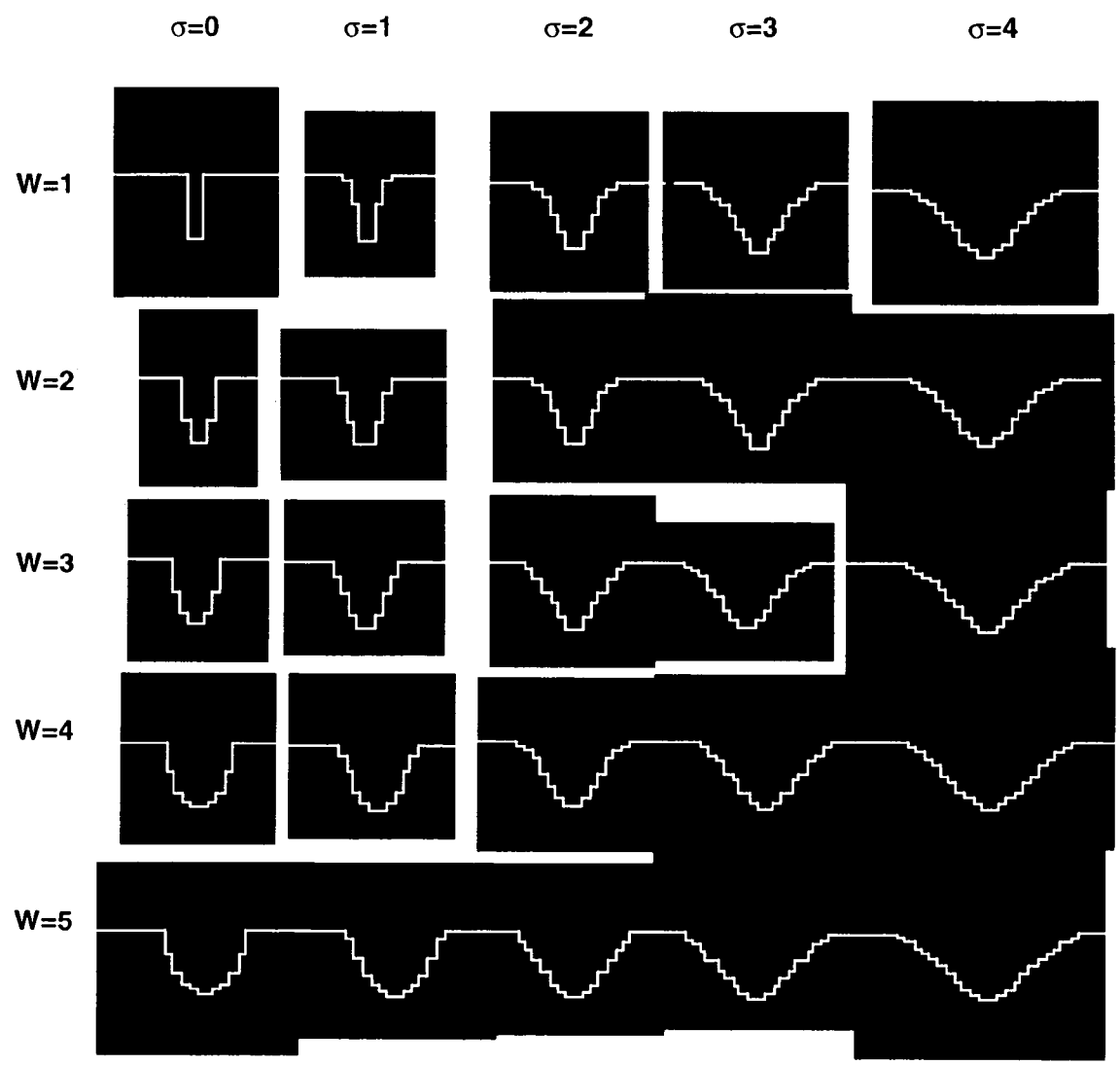
FIG. 5 is a diagram explaining an example of the formation of templates.
Figure 6:
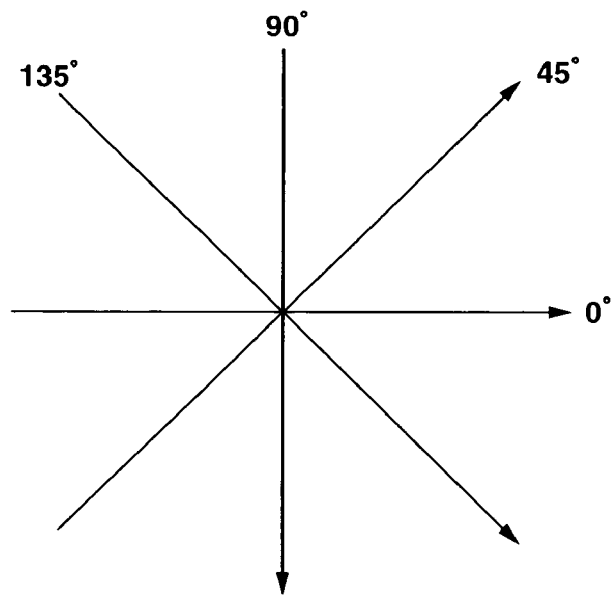
FIG. 6 is a diagram explaining an example of the combination of one-dimensional directions in template matching.

FIGS. 1 to 8 relate to a first embodiment of the present invention; FIG. 1 a block diagram explaining the structure of a personal computer for executing an image processing method according to the present embodiment; FIG. 2 a flowchart explaining the details of the image processing method according to the present embodiment; FIG. 3 a diagram explaining a blood vessel image; FIG. 4 a diagram explaining a blood vessel model according to the present embodiment; FIG. 5 a diagram explaining an example of the formation of templates; FIG. 6 a diagram explaining an example of the combination of one-dimensional directions in template matching; and FIGS. 7 and 8 diagrams explaining the determination of a blood vessel position by template matching.

The first embodiment of the present invention relates to the image processing method that is effective in extracting an image of a branching blood vessel in, particular, an endoscopic image. The image processing method according to the present embodiment will now be described below with reference to the drawings.

For a visible blood vessel image in an endoscopic image, blood vessels of different thickness may be observed such that they constitute a tree. This tree includes a thick blood vessel called a drainage blood vessel and thin blood vessels branching off therefrom.

These blood vessels are different in thickness and depth in a mucosa. Accordingly, the images of the different blood vessels are also different in contrast from each other (generally, as a blood vessel is located deeper, the image thereof becomes more blurred). A series of extraction processing steps, which will be described below, is applied to the above-mentioned blood vessel image. The image of a blood vessel serving as a structural component to be extracted is favorably extracted, thus providing objective diagnosis support.

In the description of the present invention, it is assumed that an endoscopic image includes three (color component) images of R, G, and B each having a size (the number of lateral and longitudinal pixels) of ISX×ISY. Each of the R, G, and B images provides an 8-bit gray scale having 0 to 255 levels.

The image processing method according to the present embodiment is realized as a program running on a personal computer. FIG. 1 is a block diagram of the arrangement of a personal computer and peripheral devices used in the present embodiment.

A personal computer 1 includes arithmetic means 2 serving as a CPU, a main memory 3 which is used to store data and is used as a work area, and program storage means 4 (such as a hard disk (abbreviated to HD in FIG. 1) in the present embodiment) to store a program. The personal computer 1 is connected to display means 5 such as a CRT, input means 6 such as a mouse and a keyboard, and external storage means 7 such as a magneto-optical disk (MO).

The personal computer 1 is also connected to an external network 9 such as a LAN (Local Area Network) via a network adapter 8. The external network 9 is connected to an endoscope system 11 for endoscopy and an image filing system 12 for filing image data of endoscopy.

The personal computer 1 can obtain image data from the image filing system 12 or the endoscope system 11 through the external network 9.

In the personal computer 1, the program stored in the program storage means 4 is read into the main memory 3 and is then executed by the arithmetic means 2.

Image data to be processed can be obtained as a file offline from the external storage means 7 or online via the external network 9. If the program storage means 4 has enough capacity, image data can also be stored in the personal computer 1 in a manner similar to the program.

According to the present embodiment, for example, the hard disk constituting the program storage means 4 stores templates of blood vessel models. As will be described later, the blood vessel models are obtained by modeling structural components to be extracted from input images.

The CPU constituting the arithmetic means 2 performs arithmetic processing to calculate the amount of correlation between each pixel in an image and a template using the templates, and determines the position of a pixel with higher correlation in decreasing order of correlation, thus extracting a structural component. In other words, a structural component as an extraction subject is extracted by template matching. In this case, varying the values of parameters of each template provides a plurality of different templates so that subjects with different forms and sizes can be extracted.

FIG. 2 is a flowchart explaining the details of the image processing method according to the present embodiment.

In step S1, the arithmetic means 2 of the personal computer 1 receives a G image (component) serving as a captured original image from the image filing system 12. In general endoscopic images (without using dye or a coloring agent), each structural component such as a blood vessel image or a pattern on the surface of a mucosa is mainly produced by light absorption fluctuations of blood in the mucosa.

More specifically, structural components mostly depend on the absorption band (wavelength) of hemoglobin in blood. It is known that many structural components are generally included in G images. Specifically, as the amount of blood is larger, light absorption is higher, so that the values of pixels of a G image are lowered. As the amount of blood is smaller, light is not absorbed, but is reflected. Thus, the values of pixels are increased.

In step S2, noise reduction is performed as preprocessing to random noise. According to the present embodiment, well-known median filtering (rearranging pixels including a target pixel in a mask in decreasing order of pixel value and replacing the value of the target pixel with a median value) is performed to each area of a size of 3×3 pixels.

Subsequently, in step S3, inverse γ correction is performed to the image. γ correction is non-linear processing to give a visually linear scale to an image when the image is displayed on a monitor. The inverse γ correction converts the scale into the original linear one.

In step S4, blood vessel extraction by matching using templates, namely, by template matching is performed. The details of template matching in step S4 will now be described below.

Referring to FIG. 3, when fluctuations in pixel value are extracted and cut out in, for example, one dimensional direction (x direction), from a blood vessel image in an endoscopic image, the fluctuations can be modeled (hereinbelow, referred to as a blood vessel model) into a shape similar to a semiellipse (or a semicircle) (hereinbelow, simply referred to as a semielliptic shape) shown in FIG. 4.

Therefore, a template having values W and D as parameters to define the semielliptic shape is formed. Pixels with high correlation are extracted to determine the position of a blood vessel. Thus, the blood vessel can be extracted. The width of a blood vessel can be determined from the parameter W of the corresponding template. When x denotes a coordinate of a pixel viewed in the one-dimensional direction and y denotes a pixel value, a semielliptic function in FIG. 4 can be expressed by the following expression:

$$y = k - \frac{D}{W}\sqrt{W^2 - x^2} \tag{1}$$

Where, W and D denote parameters to define the width and depth of the semielliptic blood vessel model in FIG. 4, and k denotes a fixed real number. For example, k is set to 15 in an endoscopic image. In addition, actual endoscopic images have various blurs due to out-of-focus. Accordingly, smoothing (filtering by convolution operation in a digital image, the description of convolution operation being omitted because it is a well-known technique) using a Gaussian function is performed to the blood vessel model obtained from Expression (1).

$$y = \frac{1}{\sqrt{2\pi}\,\sigma} e^{-\frac{x^2}{2\sigma^2}} \quad (2)$$

Where, σ denotes a standard deviation in the Gaussian function and is used as a parameter to determine the level of blur. As the value of σ is larger, the effect of increasing the level of blur is enhanced. Further, according to the present embodiment, in order to eliminate an influence of a variation in brightness of an image in matching, which will be described later, scale conversion (gray level transform) in the y direction using logarithmic transformation is performed.

Although a variation in the amount of light upon image capturing affects as a multiplication term on a pixel value, the variation is separated as an addition term by logarithmic transformation, thus reducing the influence. Consequently, the precision of blood vessel extraction can be increased. In other words, when scale conversion with logarithmic transformation is used, a blood vessel image can be favorably extracted almost independent of shooting conditions.

Subsequently, the formed blood vessel model is subjected to discretization so that the model is used as a template for template matching in step S4. According to the present embodiment, the blood vessel model having continuous function values is temporarily discretized such that ten subelements correspond to one element of a template (one element corresponding to one pixel of an image). Further, the average of the values of the ten subelements is calculated, thus forming a discrete template (averaging produces an effect that fluctuations between elements of a template are smoothed).

In addition, since actual blood vessel images have various widths (sizes) and depths (magnitudes of variations of pixel values), various combinations of W and D in value are formed to produce a plurality of templates. For a variation in the level of blur, templates can be added by changing the value of σ.

FIG. 5 shows examples of templates obtained by changing the values of W and σ. In this instance, D is fixed to 50. FIG. 5 shows templates with various combinations in which W=1 to 5 (step 1.0) and σ=0.0 to 4.0 (step 1.0). The size of template is properly changed depending on the values of W and σ. According to the present embodiment, a margin of one pixel is provided at a pixel position of y≅0.0 on each of both the ends of each template.

Template matching using the above-mentioned templates will now be described. Matching is executed such that the above-mentioned templates are superimposed on each pixel of an image f as in the case of convolution operation and normalized cross-correlation R expressed by the following expression is calculated (the description of normalized cross-correlation is omitted because it is well known in the art):

$$R = \frac{\sum_{i=0}^{N-1} (f_x(i) - f_{xM})(t(i) - t_M)}{\sqrt{\sum_{i=0}^{N-1} (f_x(i) - f_{xM})^2}\sqrt{\sum_{i=0}^{N-1} (t(i) - t_M)^2}} \quad (3)$$

Where, N denotes the size of a template, fx(i) denotes the i-th pixel of N pixels which are one-dimensionally cut from the image so as to correspond to the template, fxM denotes the average of fx(i), t(i) indicates the value of the i-th element of the template, and tM denotes the average of t(i). For the value of R, 0≦R≦1. As the value of R is closer to 1, the degree of matching is higher.

In an actual endoscopic image, blood vessels run in various directions. For the directions of templates and cut-out images, for example, four directions of 0°, 45°, 90°, and 135° shown in FIG. 6 are used. Normalized cross-correlation in Expression (3) is obtained with respect to the four directions, thus obtaining R0, R45, R90, and R135.

Figure 7:
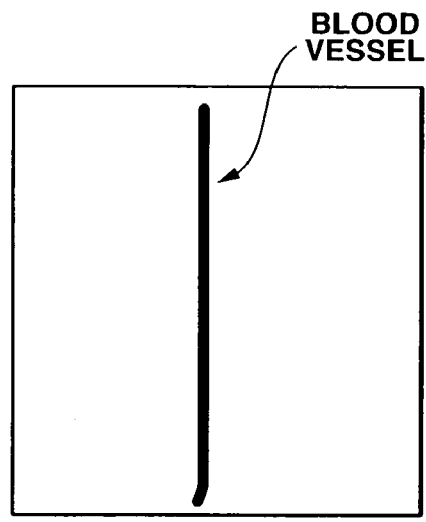
FIG. 7 is a diagram explaining a blood vessel image to describe the determination of a blood vessel position by template matching.
Figure 8:
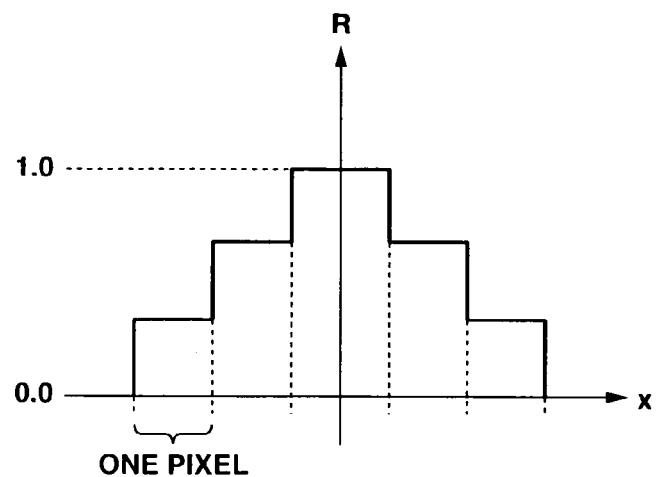
FIG. 8 is a diagram explaining the determination of a blood vessel position by template matching.

For example, referring to FIG. 7, a blood vessel image exists in the longitudinal direction of an image. When the width thereof corresponds to five pixels, the template of W=5 is applied to the image in the direction 0°. The normalized cross-correlation R0 (W=5) is the highest at the blood vessel midsection at which the blood vessel matches the template. FIG. 8 shows the values of R0 (W=5) with respect to one-dimensional shift in the template. FIG. 8 shows a distribution in which x at which R=1.0 corresponds to a pixel positioning at the center in the width direction of the blood vessel and the value of x is reduced stepwise each time x is shifted from the center by one pixel.

In the above-mentioned manner, for example, template matching is performed in M directions using K templates, so that K×M normalized cross-correlations R are obtained every pixel. When D is set to a fixed value, the magnitude relation between the normalized cross-correlations R obtained by respective templates is not changed. In the following description, therefore, for the sake of simplicity, D is set to a fixed value.

In step S5 (FIG. 2), whether a blood vessel having a target pixel at the center exists is determined on the basis of the normalized cross-correlation R calculated in step S4. The determination processing is performed as follows.

Obtained K×M values of Rij (1≦i≦K, 1≦j≦M) are compared to each other, thus obtaining the maximum value Rmax. Subsequently, the maximum value Rmax is subjected to threshold processing. On the basis of a threshold value Th (for example, Th=0.9), if Rmax≧Th, the degree of matching between a blood vessel model, having parameters W and σ corresponding to the maximum value Rmax, and an applied template in the corresponding direction θ is high. Thus, it is determined that there is a blood vessel having the target pixel at the center in the width direction.

When it is determined that the blood vessel exists, the process proceeds to step S6. If NO, the process proceeds to step S7. In step S6, the determination result in step S5 is stored into the external storage means 7. In this case, for example, the result of the following table a[k] is stored.

First, a table a[ISX×ISY] having the same size of ISX×ISY as that of the image is prepared. Values of all cells are initialized to zero.

From the results of steps S3 and S4 for the k-th pixels xk, if a template and direction in which Rmax≧Th exist, a value t (t≠0) to specify the template and direction is set to the corresponding table cells a[k]. According to the present embodiment, t indicates continuous values, for example, $1 \leq t \leq K \times M$ with respect to $K \times M$ normalized cross-correlations Rij. When it is determined that a blood vessel does not exist, the value in each table cell a[k] is set to 0 as it is.

In step S7, whether all pixels in the image are completely subjected to processing steps in steps S4 to S6 is determined. If all the pixels are not processed, the process is returned to step S4. The next pixel (from the k-th pixel xk to the (k+1)-th pixel x(k+1)) is again subjected to the processing steps in step S4 to S7. If all the pixels are completely processed, the process proceeds to step S8.

In step S8, a blood-vessel extraction image is formed from the blood vessel extraction result produced in step S6. Specifically, the value of the table cell a[k] ($1 \leq k \leq ISX \times ISY$) corresponding to each pixel is referred. If a[k]≠0, a line segment with the width W in which the pixel xk is located at the center is assigned in accordance with the width W of the template corresponding to the value of a[k] and the used direction θ.

The result of assignment of line segments to all cells a[k] indicates a blood-vessel extraction image. In program implementation, an area b[ISX×SIY] having a size of ISX×ISY is prepared for the formation of a blood-vessel extraction image. All pixels are initialized to zero. Values corresponding to line segments are set to 1. 1 is set to cells of the corresponding pixels.

By the above-mentioned series of processing steps, a blood vessel in an endoscopic image can be favorably extracted independent of the thickness (width) of the blood vessel and the level of blur.

As post-processing, general expansion or contraction processing is applied to the blood-vessel extraction image formed in step S8, so that more smoothed image can be obtained.

In the formation of the blood-vessel extraction image in step S8, it may be determined that a blood vessel exists in both the adjacent pixels. The pixel having the larger maximum value Rmax is selected and the other pixel is rejected, so that the correct result can be obtained. In this case, the area b[ISX×ISY] to store the values Rmax of respective pixels is prepared in addition to the table a[ISX×ISY]. Values are set in step S6.

As mentioned above, according to the image processing method of the present embodiment, a blood-vessel extraction image can be favorably formed from an endoscopic image.

So long as an image has a multiple gray scale, for example, an X-ray angiographic image can also be processed in addition to endoscopic images. Further, so long as a structural component has a linear shape (irrespective of length), any subject can be processed. Accordingly, a subject to be extracted is not limited to a blood vessel.

According to the present embodiment, a series of processing steps including template matching is applied to all the pixels of an image. To reduce processing time, the above series of processing step can be performed every several pixels.

There is a high probability that a pixel having a low value corresponds to a blood vessel. Therefore, pixels having a lower value are previously obtained locally by retrieving. The obtained pixels alone can be processed. In this case, when a target pixel is positioned at the center of an area of, for example, 3×3 and the target pixel has the minimum value, the target pixel can be set to a subject to be processed.

Therefore, the present embodiment has the following advantages.

According to the present embodiment, a blood-vessel extraction image can be favorably formed from an endoscopic image.

SECOND EMBODIMENT

Figure 10:
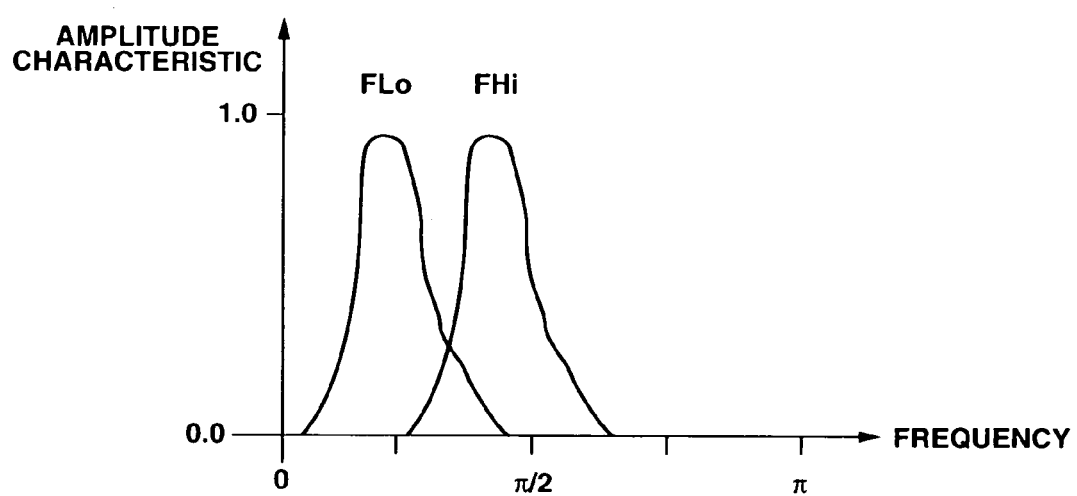
FIG. 10 is a diagram explaining frequency characteristics of band pass filters.
Figure 9:
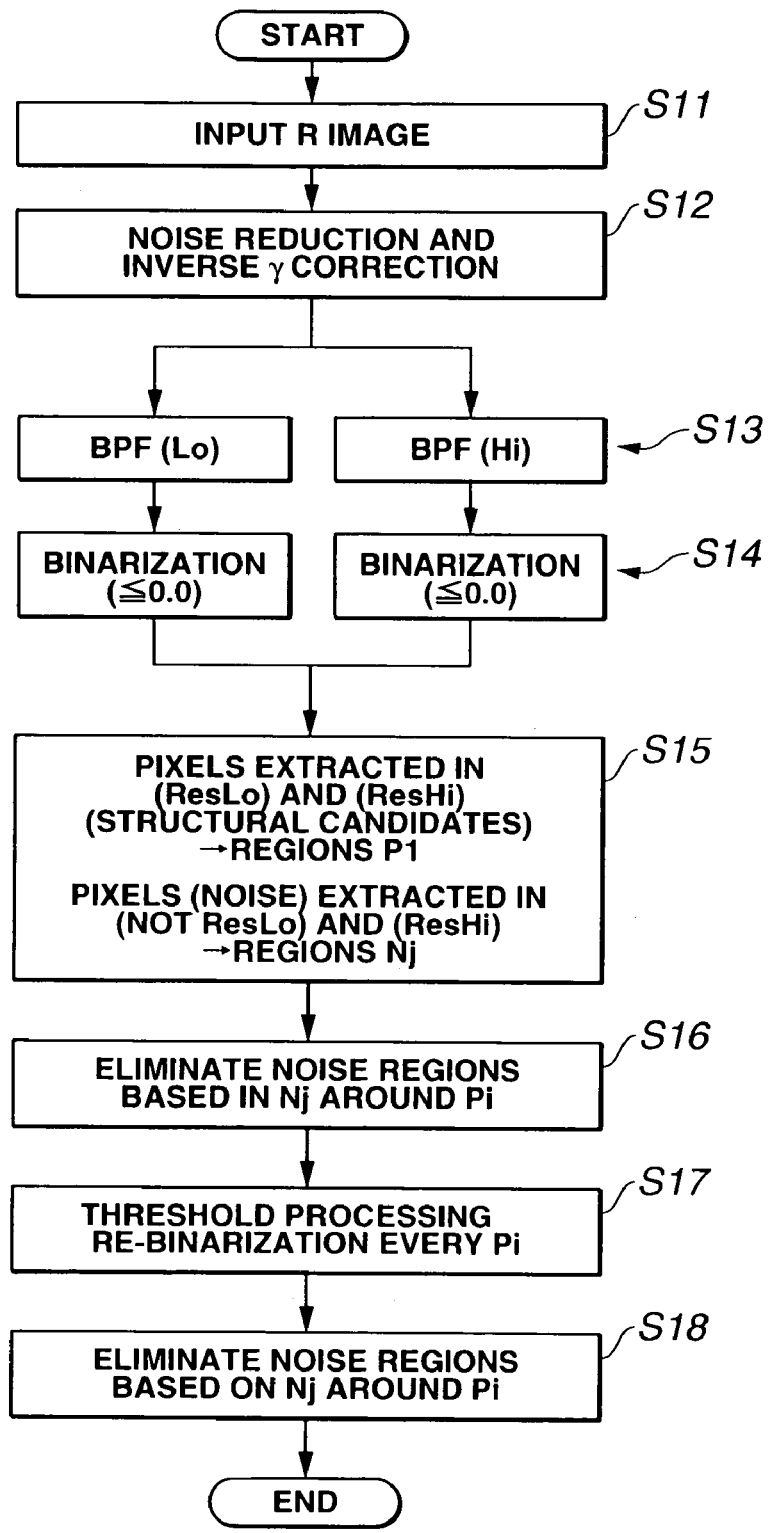
FIG. 9 is a flowchart explaining a series of processing steps according to a second embodiment of the present invention.

A second embodiment of the present invention will now be described below with reference to FIGS. 9 to 16. FIGS. 9 to 16 relate to the present embodiment; FIG. 9 a flowchart explaining a series of processing steps according to the present embodiment; FIG. 10 a diagram explaining frequency characteristics of band pass filters; and FIGS. 11 to 16 diagrams explaining an original image, images in process, and a processed image according to the present embodiment.

A series of image processing and analysis according to the present embodiment is executed as a program running on the personal computer 1 in a manner similar to the first embodiment. Since the structure of the personal computer 1 is the same as that in FIG. 1, the description thereof is omitted.

The present embodiment particularly relates to an image processing method that is effective in extracting the pattern of pits (hereinbelow, referred to as a pit pattern) of a colon in an endoscopic image.

Methods for extracting a pit pattern from an endoscopic image to analyze the shape thereof utilize binarization using threshold processing for a band pass filtered image. Disadvantageously, stable extraction is hardly performed by setting a fixed threshold value or setting a threshold value every image because an endoscopic image may have a variation in brightness and a difference or unevenness in dye density. According to the present embodiment, an image processing method, whereby pits to be analyzed can be stably extracted from an image having the above-mentioned disadvantages, will now be described.

When threshold processing is uniformly performed to an image processed by band pass filtering (hereinbelow, abbreviated to BPF) or the entire region of interest, extraction leakage or discontinuity occurs due to a variation in brightness and an unevenness in dye. In extraction, therefore, it is necessary to locally determine a threshold value for pits to be extracted as appropriate. According to the present embodiment, each region including pits to be extracted is locally extracted and the optimum threshold value is set every region.

The present embodiment utilizes the following properties of band pass filters: A high-frequency band pass filter is capable of obtaining an extraction image along the shape of a pit pattern but it is susceptible to noise. A low-frequency band pass filter obtains an extraction image that is larger than the actual shape but it is resistant to noise. According to the present embodiment, a region including an extraction target is separated from regions including other components such as noise, and a threshold value is locally set every region including an extraction target, thus favorably obtaining the extraction image.

Figure 11:
FIG. 11 is a diagram showing an example of an original image according to the present embodiment.

The image processing method will now be described on the basis of the flowchart shown in FIG. 9. In the present embodiment, an R image is used as an original image (step S11). FIG. 11 shows an example of an endoscopic R image as an original image. Dye (medical agent) called indigo carmine is sprayed in pit pattern observation. The dye is deposited in pits as hollows on the surface of a mucosa. Since the dye has tints of blue and green, the pattern of pits is most effectively reflected in an R image.

In step S12, noise reduction and inverse γ correction are performed in a manner similar to steps S2 and S3 in FIG. 2 in the first embodiment.

Subsequently, in step S13, band pass filters BPF(Lo) and BPF(Hi) having different frequency band characteristics are used to obtain respective processed images. For the band pass filters BPF(Lo) and BPF(Hi), Laplacian-Gaussian filters are used. Relatively high (Hi) and low (Lo) pass frequency bands are set. The Hi-pass frequency characteristic is along the frequency band distribution of a pit pattern component to be extracted. The Lo-pass frequency characteristic is lower than Hi by one octave.

The Laplacian-Gaussian filter is well known and is described in detail in Reference Document "Vision, David Marr, Sangyo Tosho, pp. 58-66". The detailed description thereof is omitted.

FIG. 10 shows the frequency characteristics Flo and FHi of the band pass filters BPF(Lo) and BPF(Hi) used in the present embodiment (although the frequency space of an image is essentially two-dimensional, the space is one-dimensionally shown for the sake of simplicity).

In step S14, binarization processing is performed to each of the processed images obtained through the band pass filters BPF(Lo) and BPF(Hi) on condition that the threshold value is set to 0.0. The obtained binary images are set to ResLo and ResHi. If a pixel is extracted as a pit pattern component, 1 is given to the pixel. If NO, 0 is given to the pixel.

According to the present embodiment, the dyed pit pattern component has a small pixel value as in the case of a blood vessel according to the first embodiment. Pixels, in each of which the result by the band pass filter BPF(Lo) or BPF(Hi) indicates 0 or lower are extracted as a pit pattern component. In this case, all of the pixels having a negative variation are extracted. Thus, there is no extraction leakage due to a variation in brightness and an unevenness in dye.

Figure 12:
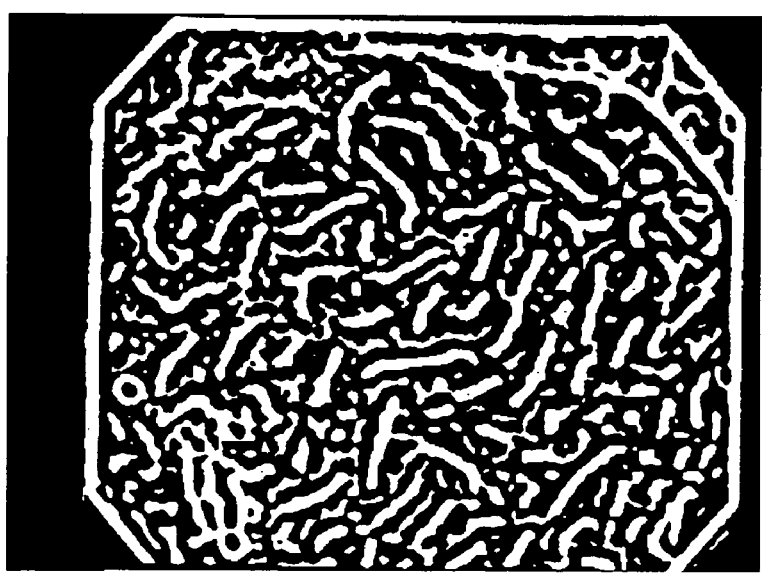
FIG. 12 shows a first image example in process.
Figure 13:
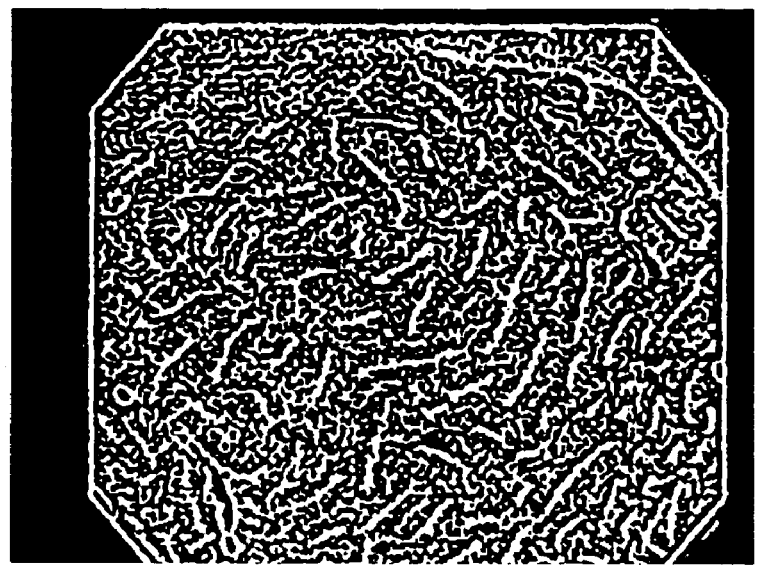
FIG. 13 shows a second image example in process.

FIGS. 12 and 13 show examples of the binary images ResLo and ResHi, respectively. The binary images are obtained by binarizing the endoscopic R image, including the pit pattern shown in FIG. 11, in step S14 of FIG. 9.

In step S15, logical operation is performed every pixel in each of ResLo and ResHi, thus extracting np regions (coupled pixel groups) Pi ($1 \leq i \leq np$) including a pit pattern component to be extracted and nn regions Nj ($1 \leq j \leq nn$) such as noise.

In this case, it is assumed that labeling is performed to the binary images to assign numbers for identifying a region to the respective regions Pi and Nj. Pixels extracted in both of ResHi and ResLo are included in Pi. Pixels, which are extracted in ResHi but are not extracted in ResLo, are included in Nj (the pixels are designated by Not ResLo in FIG. 9).

Figure 14:
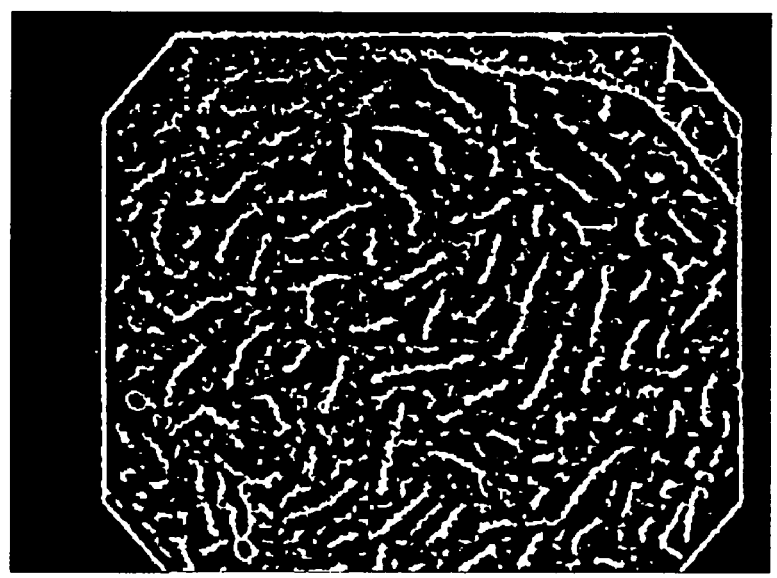
FIG. 14 shows a third image example in process.
Figure 15:
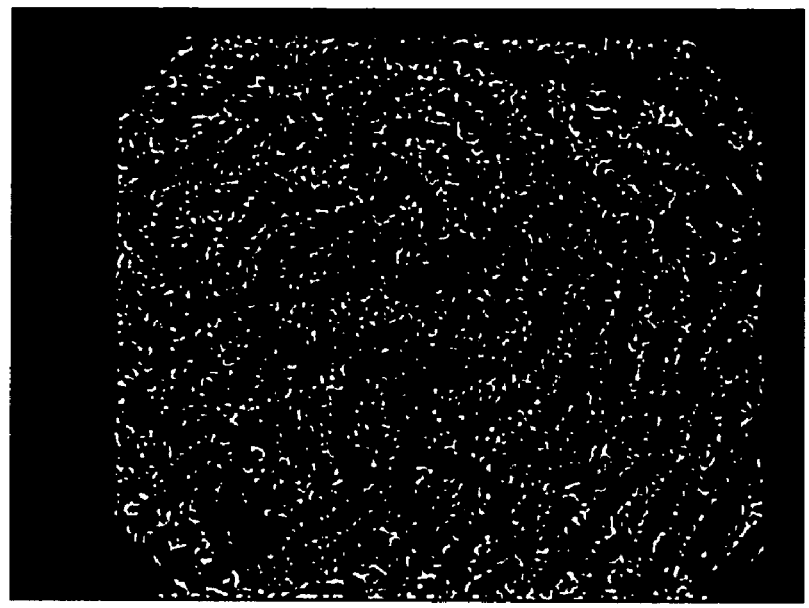
FIG. 15 shows a fourth image example in process.

FIGS. 14 and 15 show image examples of Pi and Nj.

Subsequently, in step S16, components such as noise, which cannot be completely removed in step S15, are eliminated. Specifically, the average μHi of each Pi is obtained from the absolute values in the process result ResHi of BPF (Hi). The average μHei of the eliminated noise regions Nj included in the pixels of a size of s×s surrounding the center of gravity (cxi, cyi) of Pi are obtained from the above absolute values. The average μHi is compared to the average μHei. A pit pattern component has a larger variation than that of a noise component. Accordingly, for example, when μHi≦μHei, the corresponding region is eliminated.

In step S17, a proper threshold value is set every remaining Pi and threshold processing, namely, re-binarization is performed. For example, the discriminant analysis method by Ohtsu is used to set a threshold value.

After the execution of step S17, a noise region may be remained. Further, elimination processing is performed in step S18. In this instance, the same elimination processing as that in step S16 is again performed. In this case, an elimination reference is set to μHi≦w·μHei (w>1.0), thus increasing the effect of elimination.

Figure 16:
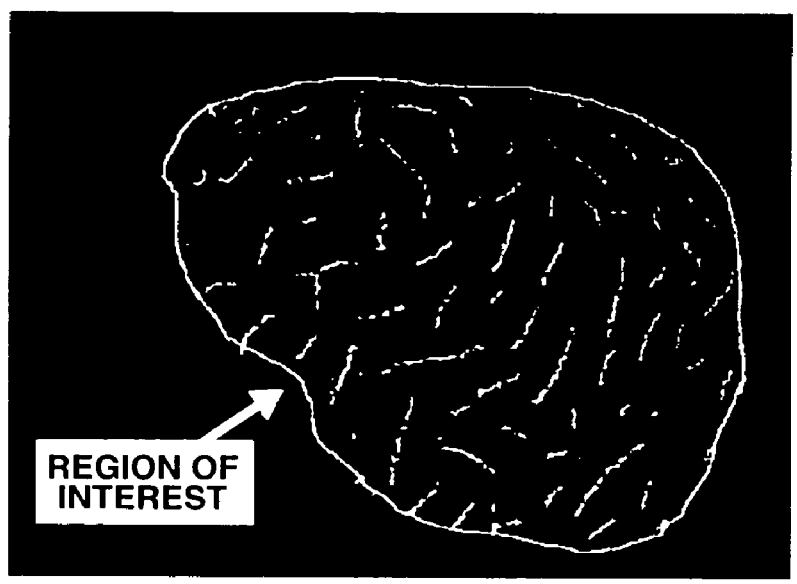
FIG. 16 shows an example of a processed image.

FIG. 16 shows an example of an extracted image obtained by the processing in step S18 (the region of interest is further set and outlines and halation are eliminated).

According to the above-mentioned series of processing steps, irrespective of shooting conditions, namely, even if an endoscopic image has a variation in brightness and a difference or unevenness in dye density, a pit extraction image can be favorably extracted from the endoscopic image.

According to the image processing method according to the present embodiment, structural components other than pits, for example, a blood vessel image can be extracted.

Therefore, the present embodiment has the following advantages.

According to the present embodiment, even if an endoscopic image has a variation in brightness and a difference or unevenness in dye density, a pit extraction image can be favorably extracted from the endoscopic image.

MODIFICATION OF SECOND EMBODIMENT

When there are regions Pi which cannot be eliminated because ResHi has no difference, elimination processing based on a difference in tint can be performed subsequent to step S18.

Specifically, the following properties are utilized: Since dye is deposited in each pit, tints of blue and green components are enhanced. For example, the ratio of R/G is obtained every pixel from the R and G images, subjected to noise reduction and inverse γ correction, of Pi and Pk (k≠i) surrounding Pi (the B image is further used and the ratio of R/(R+G+B) can also be used). The average μrgi of each region is compared to the average μrgk of each region. When μrgi>μrgk (the color of the region is red relative to the surrounding extraction regions), the corresponding region is eliminated.

In eliminating noise regions, conventionally, threshold processing (eliminating a small region) has been performed to the number of region pixels extracted by binarization. Elimination is performed based on tint information of a local pit pattern component, thus obtaining an extraction image without wrong elimination for very small pits.

According to the above-mentioned series of processing steps, even if an endoscopic image has a variation in brightness and a difference or unevenness in dye density, a pit extraction image can be favorably obtained from the endoscopic image.

The image processing method according to the present embodiment can also be performed to structural components other than pits, for example, a blood vessel image.

THIRD EMBODIMENT

Figure 17:
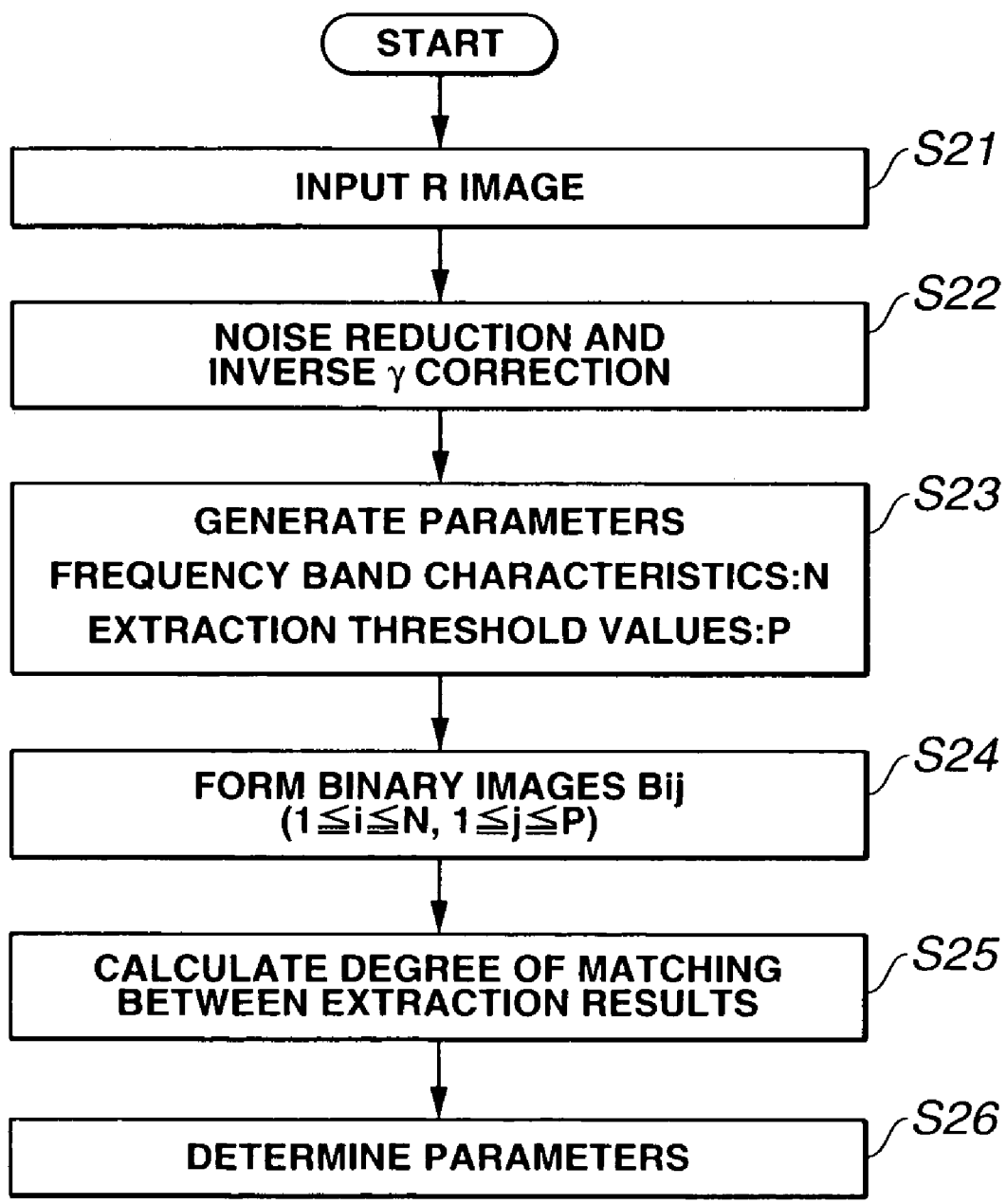
FIG. 17 is a flowchart explaining a series of processing steps according to a third embodiment of the present invention.
Figure 18:
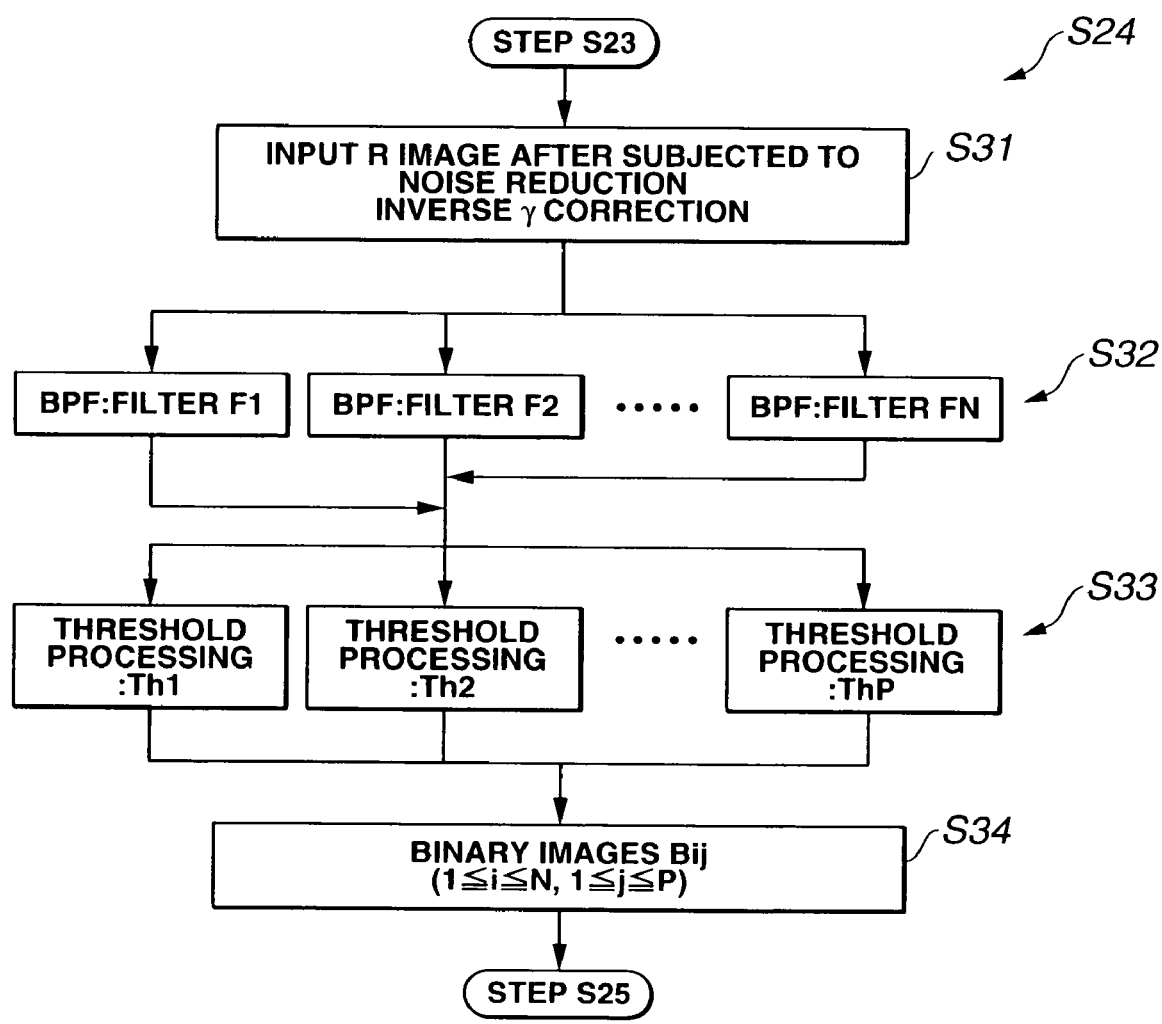
FIG. 18 is a flowchart showing the details of binary image formation in step S24 in the flowchart of FIG. 17.

A third embodiment of the present invention will now be described with reference to FIGS. 17 to 19. FIGS. 17 to 19 relate to the third embodiment. FIGS. 17 and 18 show flowcharts explaining a series of processing steps according to the present embodiment. FIG. 19 is a diagram explaining an example of the characteristics of band pass filters.

The present embodiment will describe a method for setting the optimum process parameters with efficiency in binarization processing for image analysis. A series of image processing and analysis in the present embodiment is executed as a program running on the personal computer 1 as in the case of the first embodiment. The structure of the personal computer 1 is the same as that in FIG. 1. The description thereof is omitted.

In binarization processing for extracting a structural component in an endoscopic image, it is necessary to set parameters such as the frequency characteristic of a band pass filter and various threshold values. Such adjustment is mainly performed on the basis of the subjective matching between a structural component such as a pit pattern or a blood vessel and a binarization result. For instance, a plurality of band pass filters are used, binarization results are compared to an original image with respect to the presence or absence, size, and thickness of extraction leakage in each binarization result, and respective set threshold values are changed.

In the above adjustment with trial and error, however, enormous parameters and the combinations thereof are set depending on the details of an image processing method. Disadvantageously, the burden of the operator is large.

The present embodiment relates to a method for preparing a reference image to designate an extraction target structural component on an endoscopic image and setting the optimum parameters on the basis of the comparison of the degrees of matching between the reference image and binary extraction results based on the combination of parameters.

A method for setting parameters in the present embodiment will now be described below with reference to FIGS. 17 and 18. According to the present embodiment, an extraction target is set to a pit pattern of a colon sprayed with indigo carmine of an endoscopic image as in the case of the second embodiment. Extraction is performed using band pass filtering (BPF) and threshold processing for the filtered images.

First, in step S21, an R image is input as an original image. In a manner similar to step S12 of FIG. 9 according to the second embodiment, noise reduction and inverse γ correction are performed in step S22.

Subsequently, in step S23, a plurality of parameters are generated. In other words, as process parameters for forming binary images in step S24, N ($1 \leq N$) band pass filters having different frequency characteristics and P threshold values for extraction are set.

For the frequency characteristics of the N band pass filters Fi ($1 \leq i \leq N$), for example, if N=3, the peaks of respective pass bands are provided every octave as shown in FIG. 19. Referring to FIG. 19, for the sake of simplicity, Fi denotes filter characteristic. For the P threshold values Thj ($1 \leq j \leq P$), for example, Th1=0.0, Th2=−0.1, Th2=−0.2, . . . , and ThP=(−0.1×P). In the following description of the present embodiment, P=5.

Subsequently, in step S24, binary images Bij are formed using the parameters set in step S23. FIG. 18 shows the details of binary image formation processing in step S24.

Referring to FIG. 18, in step S31, the R image subjected to the noise reduction and inverse γ correction in step S22 is input. Subsequently, in step S32, the image is subjected to band pass filtering (abbreviated to BPF in FIG. 18) using the N band pass filters Fi set in step S23.

In step S33, binarization processing using the P threshold values Thj set in step S23 is performed to the respective BPF-processed images obtained through the N band pass filters in step S32, thus forming the binary images Bij.

All of the N×P binary images Bij shown in step S34 are formed. After that, the processing in step S24 is completed. The process proceeds to step S25 in FIG. 17.

In step S25, the degree of matching between extraction results is calculated with respect to the respective obtained N×P binary images Bij as follows.

First, the operator (doctor who conducts a diagnosis) visually selects and prepares a reference image, in which an extraction target structural component is designated, to be compared to the original image. For the formation of the reference image, for example, general drawing (painting) software is used. The shape of a structural component (pit pattern of a colon in the present embodiment) is traced and painted in accordance with the state visually observed. The resultant image is used as a reference image.

In this instance, as a paint color to specify a structural component, 0, 255, 255 (constituting cyan) are set to R, G, B values because this color is not generally found in living mucous membranes of endoscopic images. In the following description, S denotes a formed reference image.

Subsequently, the degree of matching between the extraction results of the reference image S and each of the binary images Bij is calculated. The calculation of the degree of matching of extraction utilizes an evaluation function based on the number of matching extracted pixels between the binary image Bij and the reference image S and the number of matching non-extracted pixels therebetween.

According to the present embodiment, it is assumed that all pixels are extracted on the binary image Bij and pixels having values (0, 255, 255) are correctly extracted on the reference image S. The ratio of the extracted pixels to the whole pixels is obtained:

$$\alpha ij=(Mij-Lij)/(ISX \times ISY) \quad (4)$$

Where, Mij denotes the number of matching extracted pixels between the binary image Bij and the reference image S and Lij indicates the number of mismatching extracted pixels (the number of pixels which are extracted in one image but are not extracted in the other one).

Expression (4) expresses an evaluation function for the extraction result. As the value of αij is larger, the degree of matching is higher. If it is higher, it is determined that the parameters are proper. αij is calculated every Bij. After that, the process proceeds to step S26. For the degree of matching extracted pixels and the degree of matching non-extracted pixels, a function with weighting may be used depending on which degree of matching has a higher priority. According to the present embodiment, both the degrees of matching are equally evaluated.

In step S26, the respective αij are compared to each other, thus specifying i and j to obtain the maximum αij. The corresponding band pass filter Fi and the corresponding threshold value Thj are determined as process parameters.

An endoscopic image other than the reference image is subjected to binarization processing using the process parameters set as mentioned above. Thus, a favorably extracted image can be obtained without setting complex parameters by trial and error.

A variation in contrast due to a fluctuation in brightness based on shooting conditions and a variation in size of a structural component in an image due to a difference in observation distance or magnification may be generated between images. Thus, the proper threshold value and the frequency characteristic of a band pass filter may be changed. On the assumption of the above situation, typical scenes corresponding to various conditions are prepared as a plurality of reference images. Parameters corresponding to the various conditions are set and are selectively used. Thus, a favorably extracted image can be similarly obtained.

Therefore, the present embodiment has the following advantages.

According to the present embodiment, a favorably extracted image can be obtained without setting complex parameters by trial and error.

FOURTH EMBODIMENT

Figure 21:
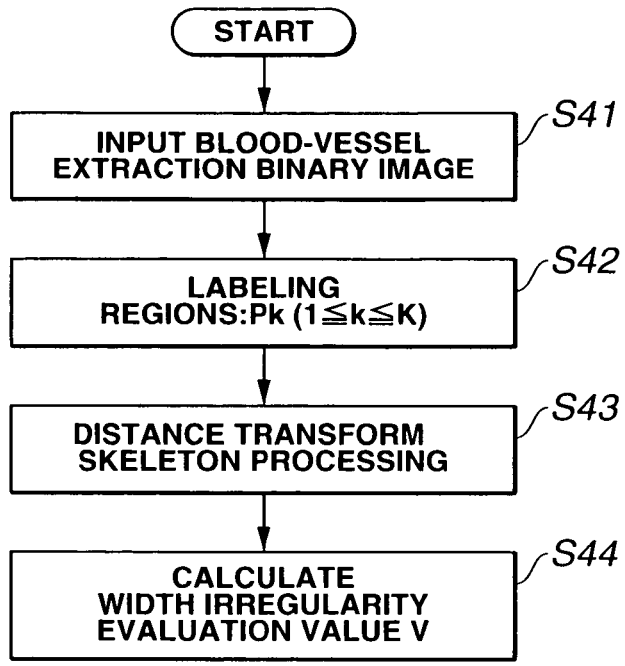
FIG. 21 is a flowchart explaining the details of a series of processing steps according the fourth embodiment of the present invention.
Figure 22:
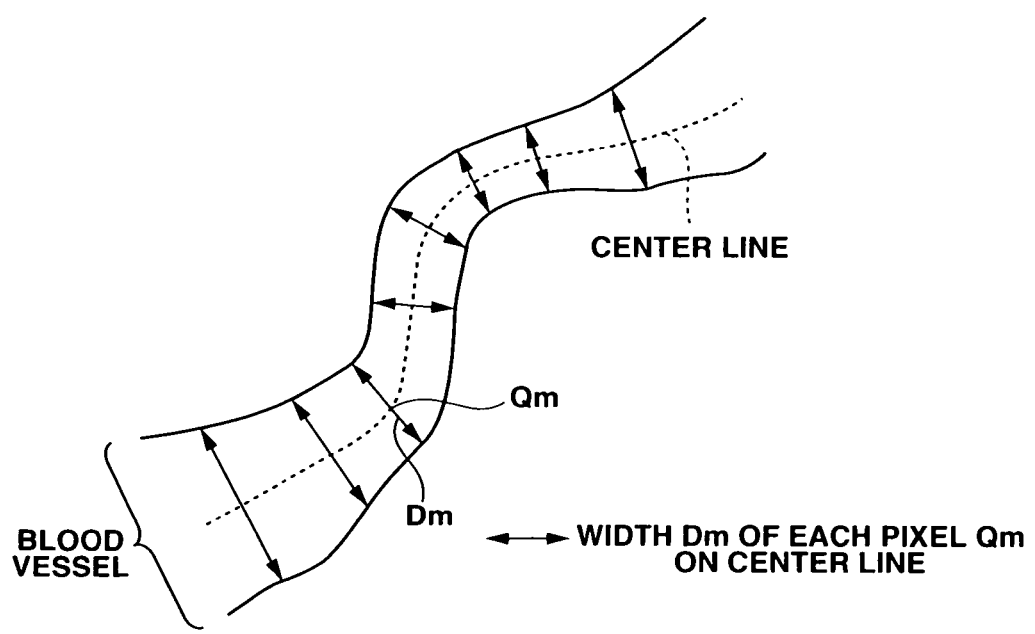
FIG. 22 is a diagram explaining the amount of feature.

A fourth embodiment of the present invention will now be described with reference to FIGS. 20 to 22. FIGS. 20 to 22 relate to the fourth embodiment. FIG. 20 shows diagrams explaining blood vessel findings to be processed by an image processing method according to the present embodiment. FIG. 21 is a flowchart explaining the details of a series of processing steps according to the present embodiment. FIG. 22 is a diagram explaining the amount of feature according to the present embodiment.

The present embodiment will describe an image processing method for calculating the amount of feature that is effectively used in determining a lesion from an extraction image obtained by binarizing a structural component in an image. A series of image processing according to the present embodiment is executed as a program running on the personal computer 1 as in the case of the first embodiment. The structure of the personal computer 1 is the same as that in FIG. 1. The description thereof is omitted.

In the description about the calculation of the amount of feature according to the present embodiment, it is assumed that processing is performed to a binary image in which a structural component has already been extracted.

For example, as a blood vessel finding in an endoscopic image, the irregular shape of a blood vessel may be important in diagnosis. Generally, as the degree of irregularity is higher, the level of malignancy or the grade of a lesion is higher. Such irregularity findings include a variation in width of a blood vessel.

FIG. 20(A) shows an image of a normal blood vessel having an almost uniform width. FIG. 20(B) shows an image of a blood vessel of a lesion, the blood vessel with a variation in width. According to the present embodiment, the following series of processing is used to calculate such a variation in width as the amount of feature.

The series of processing according to the present embodiment will now be described below with reference to FIG. 21. First, in step S41, a blood vessel extraction binary image is input. According to the present embodiment, the blood vessel extraction binary image is formed by any of the binarization and extraction processings described in the first to third embodiments of the present invention.

Subsequently, in step S42, labeling is performed to assign numbers to respective extracted blood vessel images. In the present embodiment, it is assumed that k regions Pk ($1 \leq k \leq K$) exist.

Subsequently, in step S43, distance transform and skeleton processing is performed. The distance transform and skeleton processing is one of image analysis methods, which are generally called skeletons. This processing is used to extract information related to the width of a graphic and the feature of the shape thereof. The details of the distance transform and skeleton are disclosed in Reference Document "Introduction to Computer Image Processing edited by Hideyuki Tamura, Soken Shuppan, pp. 77-80". The description thereof is omitted.

For example, referring to FIG. 22, distances Dm corresponding to the respective widths of a blood vessel can be obtained on the center line of a blood vessel image at M pixels Qm ($1 \leq m \leq M$) on the center line by the distance transform and skeleton processing.

M depends on the length of the blood vessel. If a binarized region is a circle, M=1. Actually, Mk pixels Qm and Mk distances Dm are calculated in the respective K labeled regions. Accordingly, they are set to Qkm and Dkm.

Subsequently, in step S44, a width irregularity evaluation value V is calculated on the basis of the pixels Qm and the distances Dm on the center line obtained in step S43. In the present embodiment, it is assumed that a standard deviation of the distances Dm of all Qm is set to an evaluation value.

$$V = \sqrt{\sum_{k=1}^{K} \sum_{m=1}^{Mk} (Dkm - \mu D)^2 \Big/ \left(\left(\sum_{k=1}^{K} Mk\right) - 1\right)} \quad (5)$$

Where, µD denotes the average of Dkm. As the value V is larger, a fluctuation in width is also larger. This value can be processed by a discrimination circuit (such as a linear discriminant function or a neutral network) using supervised data calculated from various image groups of normal cases and lesions.

As mentioned above, according to the series of image processing in the present embodiment, the amount of feature, which is useful in determining a lesion with irregularity, can be calculated from an extraction image obtained by binarizing a structural component in an image.

In the above description, blood vessel images in endoscopic images are used as examples. According to the present embodiment, a subject to be processed and analyzed, in which the amount of feature related to the width is useful, is not limited to them. The present embodiment can also be applied to a pit pattern image of a colon or an X-ray angiographic image.

Therefore, the present embodiment has the following advantages.

According to the present embodiment, the amount of feature, which is useful in determining a lesion with irregularity, can be calculated from an extracted image obtained by binarizing a structural component in an image.

FIFTH EMBODIMENT

Figure 23:
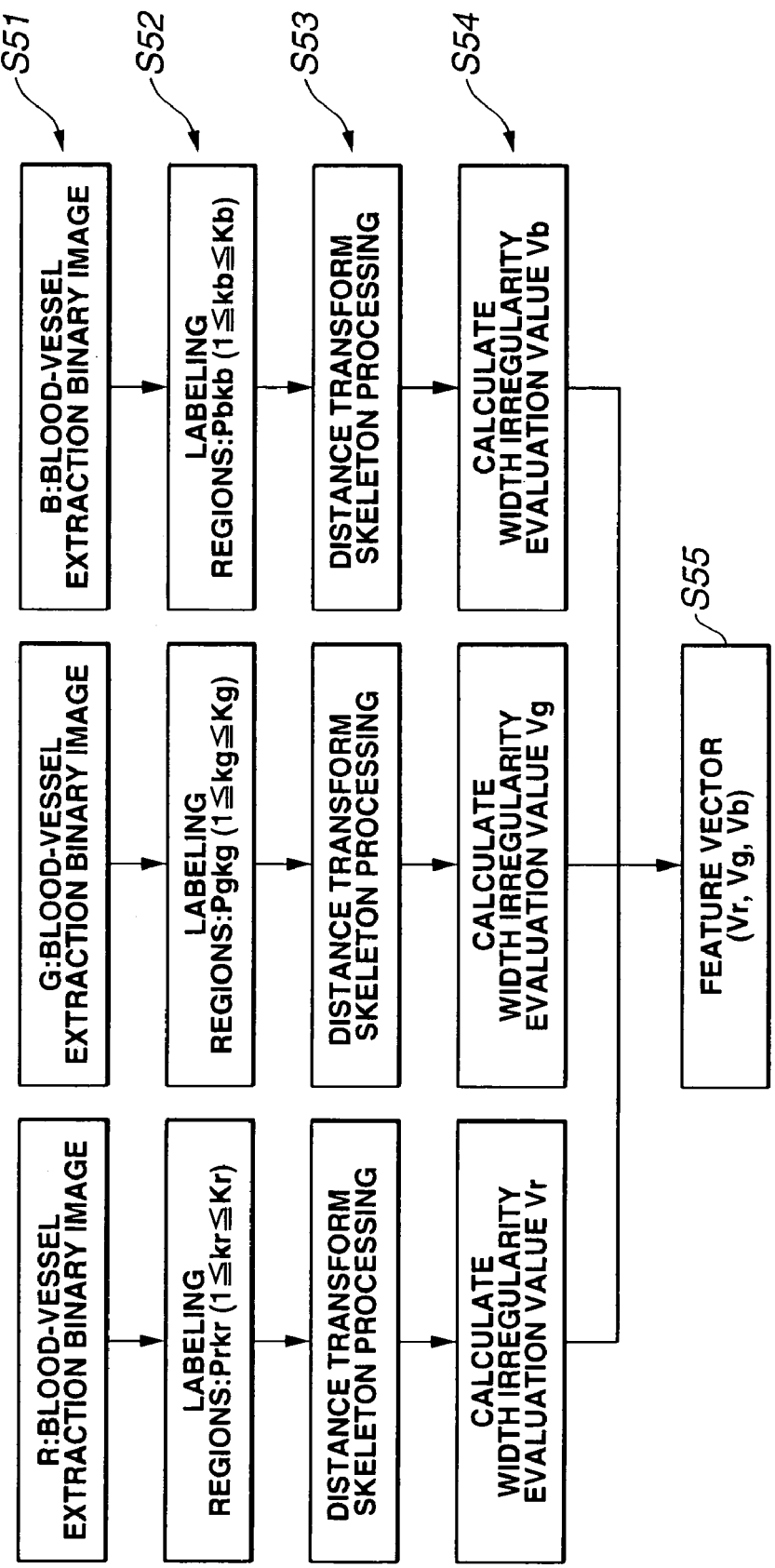
FIG. 23 is a flowchart explaining the details of a process according to a fifth embodiment of the present invention.

A fifth embodiment of the present invention will now be described with reference to FIG. 23. The present embodiment will describe an image processing method for calculating the amounts of feature which are useful in determining a lesion from a blood vessel image in an endoscopic image. More specifically, three R, G, and B images, constituting an endoscopic image, are subjected to image processing, respectively, thus obtaining a plurality of amounts of feature. The method is characterized by using the amounts of feature.

Blood vessels running through a living mucosa are different from each other in depth. In other words, the blood vessels are broadly classified into thick blood vessels running in a deep region of the mucosa, blood vessels running in an intermediate region of the mucosa, and thin blood vessels running in a region close to the surface layer. For R, G, and B images constituting an endoscopic image, the R image has the longest wavelength of irradiated light and the B image has the shortest one.

It is known that light with a long wavelength arrives at the deepest region of a living mucosa and light with a short wavelength is absorbed in a region close to the surface later. Generally, image processing without dye is performed to a G image of a general endoscopic image. According to the present embodiment, for the above-mentioned reason, the amount of feature related to a blood vessel in a deeper region is calculated from an R image and the amount of feature related to a blood vessel in a superficial region is calculated from a B image. Thus, the present image processing method is very useful in classifying a lesion on the basis of blood vessel images.

A series of image processing in the present embodiment is executed as a program running on the personal computer 1 as in the case of the first embodiment. The structure of the personal computer 1 is the same as that in FIG. 1. The description thereof is omitted.

In the description about the calculation of amounts of feature according to the present embodiment, it is assumed that processing is performed to binary images in each of which a structural component has already been extracted.

The present embodiment will be described with reference to a flowchart of FIG. 23. First, in step S51, R, G, and B blood-vessel extraction binary images are input. R, G, and B images are subjected to any of the binarization and extraction processings described in the first to third embodiments of the present invention, so that the blood-vessel extraction binary images in the present embodiment can be formed. Each image is subjected to a series of processing steps S52 to S54.

In steps S52 to S54, the same processing steps as those S42 to S44 in FIG. 21 described in the fourth embodiment are performed to the respective images to calculate width irregularity evaluation values Vr, Vg, and Vb of the R, G, and B images.

In step S55, the obtained values Vr, Vg, and Vb are set to a feature vector related to the blood vessel images in the endoscopic image to be processed. Then, the process terminates.

The feature vector (Vr, Vg, Vb) is supplied to a discrimination circuit (such as a linear discriminant function or a neural network) using supervised data calculated from various image groups of normal cases and lesions, thus obtaining information related to structural components concerned with blood vessels, which are different from each other in depth. Consequently, the classification result can be obtained with higher precision than the case using only Vg.

In the present embodiment, for the amount of feature to be calculated, the width irregularity evaluation value V explained in the fourth embodiment is described as an example. It is important that information of blood vessels, located in various depths of a mucosa, obtained by using light with different wavelengths is processed as the amounts of feature and the amounts of feature are used as a feature vector in discrimination processing. For example, therefore, if thinning a binary extraction image is used, other amounts of feature such as branch and cross points can be used.

Therefore, the present embodiment has the following advantages.

According to the present embodiment, information related to structural components concerned with blood vessels located in various depths of a living mucosa is obtained, so that the useful amounts of feature can be calculated.

SIXTH EMBODIMENT

A sixth embodiment of the present invention will now be described. The present embodiment will describe an image processing method whereby a blood-vessel extraction image can be favorably obtained even when a difference in tint of blood vessels is generated due to structural components included in three R, G, and B images constituting an endoscopic image.

To extract blood vessel images, a G image is generally processed. The structural component of a blood vessel, which is seen blue in an RGB (color) image, is reflected in an R image. Accordingly, the structural component of that blood vessel may not be favorably obtained in the G image. The above case may be caused by the difference in depth between blood vessels in a mucosa as in the case of the fifth embodiment of the present invention.

According to the present embodiment, extraction processing is performed to R and G images, respectively. The extraction results are combined with each other. Thus, a favorable blood-vessel extraction image can be obtained.

In the present embodiment, BPF-processed images, obtained by band pass filtering R and G images, and a binarization and extraction process using threshold processing are fundamentally used. Since the series of processing steps to obtain the BPF-processed images is common in the other embodiments, the description thereof is omitted.

In the following description, Br and Bg denote BPF-processed images of the R and G images, respectively. Pixels in Br and Bg are set to Br(x, y) and Bg(x, y) ($1 \leq x \leq ISX$, $1 \leq y \leq ISY$).

The following combined image Brg is formed from the basis of the BPF-processed images Br and Bg.

$$Brg(x,y) = \alpha \times Br(x,y) + \beta \times Bg(x,y) \quad (6)$$

Where, $\alpha$ and $\beta$ are defined as follows.

$$\begin{cases} \alpha = 0, \beta = 1 & \text{if } Br(x, y) > Thr, \\ \alpha = 1.0, \beta = 1.0 & \text{else (if } Br(x, y) \leq Thr). \end{cases} \quad (7)$$

Where, Thr denotes a threshold value to determine whether a structural component reflecting a blood vessel image exists in Br. For example, Thr=−1.0 (since the structure of a blood vessel has a negative variation, the sign is negative).

Expression (7) expresses a coefficient for combination. When any structural component is not included in Br(x, y), $\alpha=0$, so that only the G image is used. When it is included in Br(x, y), $\alpha=\beta=1.0$, so that the structural components of both the R and G images are combined with each other.

Using Expressions (6) and (7), the combined BPF image Brg is obtained by completely extracting the structural components in the R and G images. Finally, Brg(x, y) is subjected to threshold processing, thus forming a binary image.

As mentioned above, even when the difference in tint between blood vessels is caused by structural components included in respective images, a blood-vessel extraction result can be favorably obtained by the image processing method according to the present embodiment.

The present invention also includes embodiments obtained by partially combining the above-mentioned embodiments.

The present invention is not limited to the above-mentioned embodiments but many modifications and variations are possible within the scope of the invention without departing from the spirit of the invention.

INDUSTRIAL APPLICABILITY

As mentioned above, according to the present invention, a structural component such as a blood vessel image or a pit pattern to be extracted can be favorably extracted.

CROSS REFERENCE TO RELATED APPLICATION

This application claims benefit of Japanese Application No. 2002-354290 filed on Dec. 5, 2002, the contents of which are incorporated by reference in the description, claims, and drawings of this application.,

The invention claimed is:

1. An image processing method comprising:
    an input step of inputting an image;
    an extraction step of performing matching between a template, obtained by modeling a predetermined structural component in the image, and the image input in the input step to extract a structural component as an extraction target in the image; and
    an evaluation step on a processor of setting a plurality of different templates of the structural components to evaluate a result of matching using the different templates, wherein
    the structural component is extracted on the basis of the evaluation result in the evaluation step, and each of the different templates is determined on the basis of the number of pixels corresponding to a width of the structural component and a magnitude of variation in the width.

2. The image processing method according to claim 1, further comprising:
    a position specification step of specifying a position of the extraction target structural component in the input image by matching using the template, wherein
    in the extraction step, the extraction target structural component is extracted on the basis of the matching result in the position specification step.

3. The image processing method according to claim 2, further comprising:
    an extraction image formation step of forming a structural component extraction image on the basis of the position of the structural component and the template.

4. The image processing method according to claim 1, wherein the structural component includes a blood vessel in an observation image of a living mucosa, and
    the structural component is determined on the basis of the template or a width of the blood vessel in the image, and contrast.

5. The image processing method according to claim 1, wherein the matching includes a local correlation operation between each of the different templates and the image and extracts the structural component corresponding to a template having the highest correlation based on the correlation operation results.

6. The image processing method according to claim 5, wherein the correlation operation includes a normalized cross-correlation.

7. The image processing method according to claim 1, wherein the template has a one-dimensional shape of N×1 (N≧3) and the matching is performed to the image in a plurality of directions.

8. The image processing method according to claim 1, wherein the image input in the input step includes an endoscopic image.

9. The image processing method according to claim 1, wherein the structural component includes a blood vessel or a pit in the image.

10. An image processing method comprising:
    an input step of inputting an image;
    a first extraction step on a processor of performing a first region extraction process to the image input in the input step to extract a first region group including one or more regions; and a second extraction step on the processor of performing a second region extraction process for every region included in the first region group,
    wherein in the first extraction step, the region is extracted on the basis of a logical operation of a first binary image and a second binary image, the first binary image being based on a result of first filtering with first pass frequency band characteristic, the second binary image being based on a result of second filtering with second pass frequency band characteristic.

11. The image processing method according to claim 10, wherein
    in the first extraction step, the region group is extracted such that the region group redundantly includes a structural component to be extracted in the image, and
    in the second extraction step, the region group is extracted such that an unnecessary structural component is eliminated from the first region group.

12. The image processing method according to claim 10, wherein the logical operation separates the region group, extracted in the first binary image based on the first filtering result, into regions including a desired structural component and regions including no desired structural component.

13. The image processing method according to claim 12, wherein
    the first pass frequency band characteristic is determined on the basis of the structural component in the image, and
    the second pass frequency band characteristic is determined relatively lower than the first pass frequency band characteristic.

14. The image processing method according to claim 12, wherein the logical operation extracts pixels, extracted in both the binary images based on the first and second filtering results, as the first region group.

15. The image processing method according to claim 14, wherein in the second extraction step, threshold processing is performed to the first filtering result corresponding to each extracted region in the first region extraction result to extract a region.

16. An image processing method comprising:
    a filtering step of performing first and second band pass filtering to an image;
    a first binary image formation step on a processor of forming first and second binary images from the first and second band pass filtering results with first and second frequency band characteristics;
    region group specification step on the processor of specifying a first region group including a structural component to be extracted in the image and a second region group including no structural component on the basis of logical operation for the first and second binary images;
    a re-extraction step on the processor of again extracting a desired structural component from the first region group on the basis of the second region group specified in the region group specification step; and
    a second binary image formation step on the processor of forming a binary image every region included in the first region group.

17. An image processing method comprising:
an input step of inputting an image;
an extraction step of extracting a predetermined structural component from the image input in the input step; and
a feature-amount calculation step on a processor of calculating an amount of feature based on a width of the structural component extracted in the extraction step,
wherein the extraction in the extraction step includes a binary image formation step of forming a binary image of the predetermined structural component in the image,
the width of the structural component is based on the result of a distance transform and skeleton process for the binary image, and
the amount of feature includes a numeric value to evaluate the magnitude of variation in the width of the structural component.

18. The image processing method according to claim 17, wherein the numeric value includes a standard deviation or distribution.

19. An image processing method comprising:
an input step of inputting an image comprising a plurality of color signals;
an extraction step of extracting desired structural components from at least two of the color signals constituting the image input in the input step; and
a calculation step on a processor of calculating the combination of amounts of feature based on the desired structural components extracted in the extraction step,
wherein the extraction in the extraction step includes a binary image formation step of forming a binary image of the predetermined structural component in the image,
the width of the structural component is based on the result of a distance transform and skeleton process for the binary image, and
the amount of feature includes a numeric value to evaluate the magnitude of variation in the width of the structural component.

20. The image processing method according to claim 19, wherein
the extraction in the extraction step includes a binary image formation step of forming a binary image of each structural component, and
in the calculation step, the combination of the amounts of feature is calculated based on the binary images.

21. An image processing method comprising:
an input step of inputting an image including a plurality of color signals;
an extraction step of extracting desired structural components from at least two of the color signals constituting the image input in the input step;
a combination step on a processor of combining the structural components extracted in the extraction step; and
a calculation step of calculating the amount of feature based on the combination result in the combination step,
wherein the extraction in the extraction step includes a binary image formation step of forming a binary image of the predetermined structural component in the image,
the width of the structural component is based on the result of a distance transform and skeleton process for the binary image, and
the amount of feature includes a numeric value to evaluate the magnitude of variation in the width of the structural component.

22. The image processing method according to claim 21, wherein in the combination step, the combination is performed on the basis of local values of the structural components.

23. An image processing system comprising:
an input unit for inputting an image;
an extraction unit for performing matching between a template, obtained by modeling a predetermined structural component in the image, and the image input in the input unit to extract a structural component serving as an extraction target in the image; and
an evaluation unit for setting a plurality of different templates of the structural components to evaluate a result of matching using the different templates, wherein
the structural component is extracted on the basis of the evaluation result in the evaluation unit, and each of the different templates is determined on the basis of the number of pixels corresponding to a width of the structural component and a magnitude of variation in the width.

24. The image processing system according to claim 23, further comprising:
a position specification unit for specifying a position of the extraction target structural component in the input image, wherein
the extraction unit extracts the extraction target structural component on the basis of the matching result obtained by the position specification unit.

* * * * *